United States Patent
Howland

(10) Patent No.: US 9,170,071 B2
(45) Date of Patent: *Oct. 27, 2015

(54) MOSAIC EXTREMITY PROTECTION SYSTEM WITH TRANSPORTABLE SOLID ELEMENTS

(75) Inventor: Charles A Howland, Temple, NH (US)

(73) Assignee: Warwick Mills Inc., New Ipswich, NH (US)

( * ) Notice: Subject to any disclaimer, the term of this patent is extended or adjusted under 35 U.S.C. 154(b) by 31 days.

This patent is subject to a terminal disclaimer.

(21) Appl. No.: 12/902,285

(22) Filed: Oct. 12, 2010

(65) Prior Publication Data

US 2011/0023697 A1 Feb. 3, 2011

Related U.S. Application Data

(63) Continuation-in-part of application No. 11/742,705, filed on May 1, 2007, now Pat. No. 7,874,239.

(60) Provisional application No. 60/796,440, filed on May 1, 2006, provisional application No. 60/837,098, filed on Aug. 11, 2006.

(51) Int. Cl.
*F41H 5/08* (2006.01)
*F41H 1/02* (2006.01)
(Continued)

(52) U.S. Cl.
CPC *F41H 1/02* (2013.01); *B32B 37/12* (2013.01); *F41H 5/0428* (2013.01);
(Continued)

(58) Field of Classification Search
USPC ........ 2/2.5; 89/36.01, 36.02, 36.05, 906, 907, 89/908, 917; 428/911
See application file for complete search history.

(56) References Cited

U.S. PATENT DOCUMENTS

| | | |
|---|---|---|
| 1,739,112 A | 12/1929 | Wisbrod |
| 2,771,384 A | 11/1956 | Collins |

(Continued)

FOREIGN PATENT DOCUMENTS

| | | |
|---|---|---|
| EP | 0933612 A2 | 8/1999 |
| EP | 0967453 A1 | 12/1999 |

(Continued)

OTHER PUBLICATIONS

PCT Search Report dated Aug. 22, 2008 of Patent Application No. PCT/US07/67878 filed May 1, 2007, 1 page.
(Continued)

*Primary Examiner* — Michelle R Clement
(74) *Attorney, Agent, or Firm* — Maine Cernota & Rardin

(57) ABSTRACT

A flexible armor system adaptable to a garment suitable for extremity protection uses a planar array of polygon-shaped solid elements which detach upon projectile impact and combine their mass with the projectile for reduced velocity and increased impact area. The solid elements are bonded between an elastic strike-side spall cover and a high tensile strength flexible backer layer, and are further supported by a substantial fiber pack. In embodiments, the solid elements are ceramic and are commutated but remain essentially intact after the projectile impact. Edge bars can cover junctures between solid elements, and center buttons can cover intersections between the junctures. Edge bars and center buttons can also be ceramic. The ceramic parts can include titanium backing layers. After formation, ceramic cores can be compressed upon cooling by an outer ceramic layer having a higher coefficient of thermal expansion, the outer layer being formed by glazing or doping.

30 Claims, 17 Drawing Sheets

(51) Int. Cl.
*F41H 5/04* (2006.01)
*B32B 37/12* (2006.01)

(52) U.S. Cl.
CPC ........... *F41H 5/0435* (2013.01); *F41H 5/0457* (2013.01); *F41H 5/0471* (2013.01); *F41H 5/0492* (2013.01); *B32B 2307/542* (2013.01); *B32B 2313/02* (2013.01); *B32B 2323/04* (2013.01); *Y10T 156/1092* (2015.01); *Y10T 156/1093* (2015.01)

(56) References Cited

U.S. PATENT DOCUMENTS

| | | | |
|---|---|---|---|
| 2,942,327 A | 6/1960 | Corry | |
| 3,130,414 A | 4/1964 | Bailey et al. | |
| 3,392,406 A | 7/1968 | Pemini et al. | |
| 3,509,833 A * | 5/1970 | Cook | 109/82 |
| 3,683,828 A * | 8/1972 | Alliegro et al. | 109/83 |
| 3,826,172 A | 7/1974 | Dawson | |
| 3,945,042 A | 3/1976 | Lobo | |
| 4,090,011 A | 5/1978 | Barkman et al. | |
| 4,179,979 A * | 12/1979 | Cook et al. | 89/36.02 |
| 4,198,707 A | 4/1980 | Haupt et al. | |
| 4,368,660 A * | 1/1983 | Held | 89/36.17 |
| 2,640,987 A | 6/1983 | Ehlers | |
| 4,559,251 A * | 12/1985 | Wachi | 428/53 |
| 4,574,105 A | 3/1986 | Donovan | |
| 4,660,223 A | 4/1987 | Fritch | |
| 4,911,061 A | 3/1990 | Pivitt et al. | |
| 5,102,723 A | 4/1992 | Pepin | |
| 5,175,040 A | 12/1992 | Harpell et al. | |
| 5,185,195 A | 2/1993 | Harpell et al. | |
| 5,191,166 A | 3/1993 | Smirlock et al. | |
| 5,196,252 A | 3/1993 | Harpell | |
| 5,198,280 A | 3/1993 | Harpell et al. | |
| 5,254,383 A | 10/1993 | Harpell et al. | |
| 5,326,249 A | 7/1994 | Weissfloch | |
| 5,361,678 A * | 11/1994 | Roopchand et al. | 89/36.02 |
| 5,362,527 A | 11/1994 | Harpell et al. | |
| 5,364,679 A | 11/1994 | Groves | |
| 5,565,264 A | 10/1996 | Howland | |
| 5,591,933 A | 1/1997 | Li et al. | |
| 5,601,895 A | 2/1997 | Cunningham | |
| 5,619,748 A | 4/1997 | Nelson et al. | |
| 5,668,344 A | 9/1997 | Bornstein | |
| 5,677,029 A | 10/1997 | Prevorsek et al. | |
| 5,686,689 A * | 11/1997 | Snedeker et al. | 89/36.02 |
| 5,738,925 A | 4/1998 | Chaput | |
| 5,804,757 A * | 9/1998 | Wynne | 89/36.05 |
| 5,824,940 A | 10/1998 | Chediak et al. | |
| 5,827,608 A | 10/1998 | Rinehart et al. | |
| 5,837,623 A | 11/1998 | Howland | |
| 5,853,547 A | 12/1998 | Aherns et al. | |
| 5,882,357 A | 3/1999 | Sun et al. | |
| 5,891,379 A | 4/1999 | Bhattacharyya et al. | |
| 5,976,656 A * | 11/1999 | Giraud | 428/44 |
| 5,976,996 A | 11/1999 | Howland | |
| 6,035,438 A | 3/2000 | Neal et al. | |
| 6,077,319 A | 6/2000 | Sun et al. | |
| 6,266,818 B1 | 7/2001 | Howland et al. | |
| 6,332,390 B1 * | 12/2001 | Lyons | 89/36.02 |
| 6,370,690 B1 * | 4/2002 | Neal | 2/2.5 |
| 6,474,213 B1 * | 11/2002 | Walker et al. | 89/36.17 |
| 6,510,777 B2 | 1/2003 | Neal | |
| 6,534,426 B1 | 3/2003 | Chiou | |
| 6,543,055 B2 | 4/2003 | Howland et al. | |
| 6,548,430 B1 | 4/2003 | Howland | |
| 6,612,217 B1 | 9/2003 | Shockey et al. | |
| 6,627,562 B1 | 9/2003 | Gehring, Jr. | |
| 6,647,856 B1 * | 11/2003 | Neal | 89/36.02 |
| 6,668,868 B2 | 12/2003 | Howland et al. | |
| 6,693,052 B2 | 2/2004 | Howland | |
| 6,718,861 B1 * | 4/2004 | Johnson et al. | 89/36.02 |
| 6,720,277 B1 | 4/2004 | Howland | |
| 6,743,498 B2 | 6/2004 | Fourmeux | |
| 6,770,287 B1 | 8/2004 | Sun et al. | |
| 6,834,685 B2 | 12/2004 | Hannigan et al. | |
| 6,840,288 B2 | 1/2005 | Zhu et al. | |
| 6,911,247 B2 | 6/2005 | Howland | |
| 6,997,218 B1 | 2/2006 | Garcia et al. | |
| 6,998,165 B2 | 2/2006 | Howland | |
| 7,007,308 B1 | 3/2006 | Howland et al. | |
| 7,077,048 B1 * | 7/2006 | Anderson et al. | 89/36.02 |
| 7,115,315 B2 | 10/2006 | Fowler | |
| 7,192,498 B2 | 3/2007 | Howland | |
| 7,393,588 B1 * | 7/2008 | Howland | 428/415 |
| 7,478,579 B2 * | 1/2009 | Carberry et al. | 89/36.02 |
| 7,866,248 B2 * | 1/2011 | Moore et al. | 89/36.02 |
| 8,069,494 B2 | 12/2011 | Sundnes | |
| 8,087,143 B2 * | 1/2012 | DiPietro | 29/458 |
| 8,176,829 B1 * | 5/2012 | Carberry et al. | 89/36.02 |
| 8,314,038 B2 * | 11/2012 | Rockenfeller et al. | 442/86 |
| 8,616,113 B2 * | 12/2013 | Gallo et al. | 89/36.02 |
| 8,795,828 B2 * | 8/2014 | Grozdanich et al. | 428/325 |
| 8,833,229 B2 * | 9/2014 | Baxter et al. | 89/36.01 |
| 2001/0053645 A1 | 12/2001 | Henderson | |
| 2002/0069444 A1 | 6/2002 | Graham et al. | |
| 2002/0106956 A1 | 8/2002 | Howland | |
| 2002/0111099 A1 | 8/2002 | Howland | |
| 2002/0122927 A1 * | 9/2002 | Howland | 428/292.1 |
| 2002/0124904 A1 | 9/2002 | Howland et al. | |
| 2002/0178900 A1 * | 12/2002 | Ghiorse et al. | 89/36.02 |
| 2003/0064191 A1 * | 4/2003 | Fisher | 428/49 |
| 2003/0159575 A1 | 8/2003 | Reichman | |
| 2003/0228815 A1 | 12/2003 | Bhatnagar et al. | |
| 2004/0092183 A1 | 5/2004 | Geva et al. | |
| 2005/0005762 A1 * | 1/2005 | Lujan | 89/36.02 |
| 2005/0053769 A1 * | 3/2005 | Imblum et al. | 428/170 |
| 2005/0118716 A1 | 6/2005 | Howland et al. | |
| 2005/0197024 A1 | 9/2005 | Howland | |
| 2005/0255776 A1 | 11/2005 | Howland | |
| 2005/0288797 A1 | 12/2005 | Howland | |
| 2006/0005305 A1 | 1/2006 | Haskell | |
| 2006/0014457 A1 | 1/2006 | Newton et al. | |
| 2006/0068158 A1 | 3/2006 | Howland | |
| 2007/0016996 A1 | 1/2007 | Seitzinger et al. | |
| 2007/0054817 A1 | 3/2007 | Li et al. | |
| 2007/0068377 A1 * | 3/2007 | Qiao et al. | 89/36.02 |
| 2007/0099526 A1 | 5/2007 | Heerden et al. | |
| 2007/0238379 A1 | 10/2007 | Bhatnagar et al. | |
| 2008/0011153 A1 * | 1/2008 | MacDonald | 89/36.02 |
| 2008/0032084 A1 | 2/2008 | Biermann et al. | |
| 2008/0087161 A1 | 4/2008 | Dean et al. | |
| 2008/0104735 A1 | 5/2008 | Howland | |
| 2008/0105114 A1 * | 5/2008 | Gabrys | 89/36.02 |
| 2008/0160855 A1 * | 7/2008 | Howland | 442/341 |
| 2008/0307553 A1 * | 12/2008 | Jbeili et al. | 2/2.5 |
| 2009/0114083 A1 * | 5/2009 | Moore et al. | 89/36.02 |
| 2009/0255022 A1 | 10/2009 | Smith | |
| 2009/0293711 A1 | 12/2009 | Altergott et al. | |
| 2010/0282062 A1 * | 11/2010 | Sane et al. | 89/36.02 |
| 2010/0319441 A1 | 12/2010 | Hirschberg et al. | |
| 2011/0107904 A1 * | 5/2011 | Queheillalt et al. | 89/36.02 |
| 2011/0220280 A1 * | 9/2011 | DiPietro | 156/285 |
| 2011/0303079 A1 * | 12/2011 | Joynt | 89/36.02 |
| 2012/0017754 A1 * | 1/2012 | Joynt | 89/36.02 |
| 2012/0090451 A1 * | 4/2012 | Joynt | 89/36.02 |
| 2012/0097017 A1 * | 4/2012 | Carberry et al. | 89/36.02 |
| 2012/0144987 A1 * | 6/2012 | Ficht et al. | 89/36.02 |
| 2012/0152098 A1 | 6/2012 | Howland et al. | |
| 2012/0159680 A1 | 6/2012 | Howland | |
| 2012/0186425 A1 * | 7/2012 | Kocher et al. | 89/36.02 |
| 2012/0196147 A1 * | 8/2012 | Rabiei | 428/613 |
| 2012/0318130 A1 * | 12/2012 | Genihovich et al. | 89/36.02 |
| 2013/0019740 A1 * | 1/2013 | Larue | 89/36.02 |
| 2013/0220107 A1 * | 8/2013 | Gettle et al. | 89/36.02 |
| 2013/0263727 A1 * | 10/2013 | O'Masta et al. | 89/36.02 |
| 2014/0091241 A1 * | 4/2014 | Rabiei | 250/518.1 |
| 2014/0208928 A1 * | 7/2014 | Knies et al. | 89/36.02 |

FOREIGN PATENT DOCUMENTS

| | | |
|---|---|---|
| GB | 2004177 A | 3/1979 |
| KR | 1020100004357 A | 1/2010 |

(56) References Cited

FOREIGN PATENT DOCUMENTS

| WO | 9220520 | A1 | 11/1992 |
|---|---|---|---|
| WO | 0033013 | | 6/2000 |
| WO | 0210667 | A2 | 2/2002 |
| WO | 03057462 | A1 | 7/2003 |
| WO | 2005044559 | | 5/2005 |
| WO | 2008048301 | A2 | 4/2008 |

OTHER PUBLICATIONS

Anderson, Charles E. Jr., et al., "On the Hydrodynamic Approximation for Long-Rod Penetration", International Journal of Impact Engineering, 1999, pp. 23-43, vol. 22.
Kleponis, David S., et al., Material Design Paradigms for Optimal Functional Gradient Armors, Mar. 13, 2000, 6 pages.
PCT Search Report for PCT Application No. PCT/US2008-081688, Jun. 16, 2009, 1 page.
Anderson, Charles E., An Examination of Long-Rod Penetration, Int. J. Impact Engng vol. 11, No. 4, 1991, pp. 481-501.
Anderson, Charles E., Long-Rod Penetration, Target Resistance, and Hypervelocity Impact, Int. J. Impact Engng vol. 14, No. 1-4, 1993, pp. 1-12.
European Examination Report for EP Application No. 01994286.1, dated Oct. 1, 2007, 7 pgs.
European Examination Report for EP Application No. 01994286.1, dated May 15, 2009, 3 pgs.
European Examination Report for EP Application No. 01994286.1, dated Aug. 16, 2010, 4 pgs.
European Examination Report for EP Application No. 04796627.0, Jul. 13, 2010, 8 pgs.
European Examination Report for EP Application No. 04796627.0, Mar. 28, 2011, 7 pgs.
European Search Report for EP Application No. 05724858, Mar. 25, 2010.
European Supplementary Partial Search Report for EP Application No. 01994286, dated Jan. 10, 2005, 4 pgs.
Walker, James, A Time-Dependent Model for Long-Rod Penetration, Int. J. Impact Engng vol. 16, No. 1, pp. 19-48, 1995.
PCT International Search Report dated Jun. 28, 2002 of International Appl. No. PCT/US01/48947 filed Dec. 13, 2001.
European Search Report for EP Application No. 04796627.0, Mar. 15, 2010, 4 pages.
PCT Search Report for App. No. PCT/US04/35784, dated Mar 7, 2005.
PCT Search Report for PCT Application No. PCT/US2005/07402, Aug. 7, 2006, 1 page.
PCT Search Report and Written Opinion for PCT Application No. PCT/US2011/031656, Feb. 8, 2012, 14 pages.
European Search Report for EP Application No. 07868256.4, Oct. 24, 2012, 6 pgs.
European Search Report for EP Application No. 08870614, Nov. 19, 2012, 6 pgs.

* cited by examiner

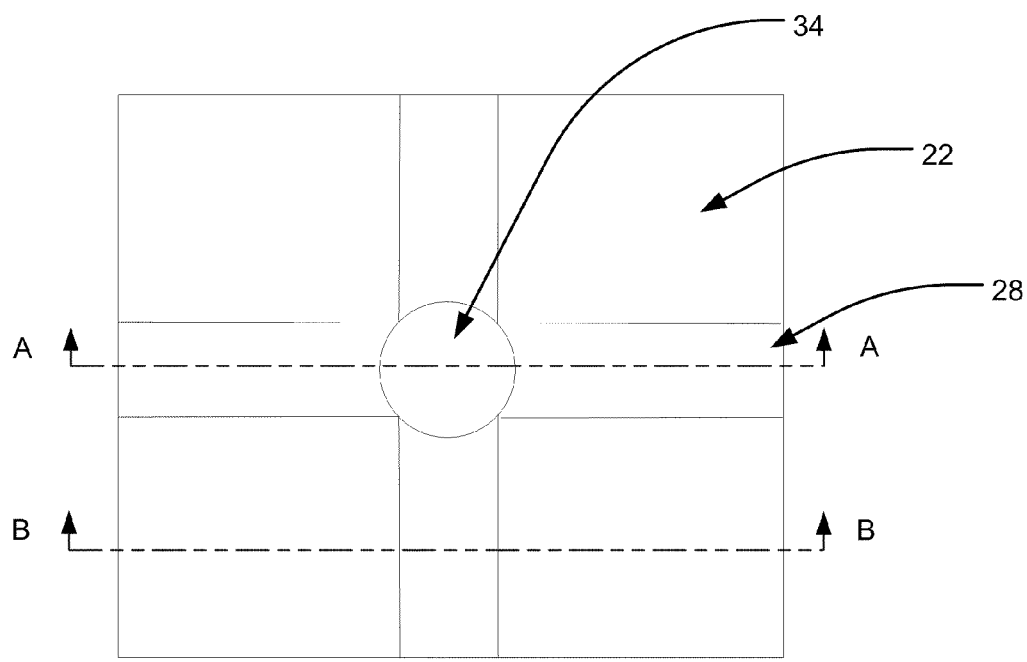
Figure 3
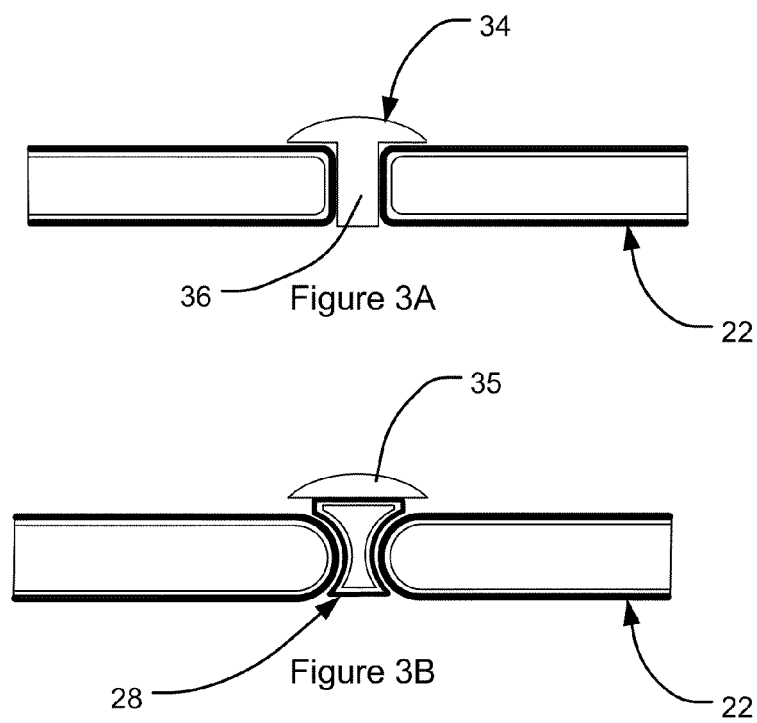
Figure 3A
Figure 3B

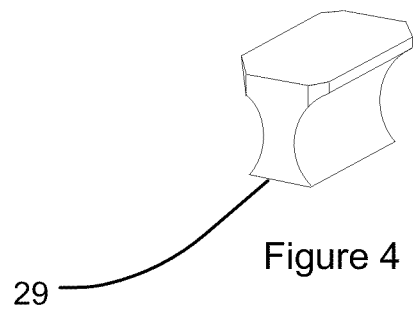
29  Figure 4
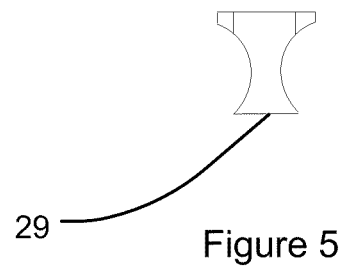
29  Figure 5
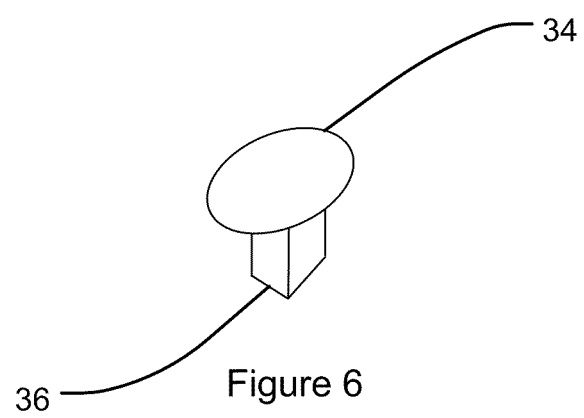
36  Figure 6

MOSAIC EXTREMITY PROTECTION SYSTEM WITH TRANSPORTABLE SOLID ELEMENTS

RELATED APPLICATIONS

This application is a continuation in part of co-pending application Ser. No. 11/742,705 filed May 1, 2007, which claims the benefit of U.S. Provisional Application Nos. 60/796,440 filed May 1, 2006, and 60/837,098 filed Aug. 11, 2006. Each of these applications is herein incorporated by reference in its entirety for all purposes.

STATEMENT OF GOVERNMENT INTEREST

Portions of the present invention may have been made in conjunction with Government funding under contract number W911QY-06-C-0105, and there may be certain rights to the Government.

FIELD OF INVENTION

This invention relates to protective systems for shielding human users from strikes by selected types of penetrators, and in particular to composite material systems providing adequate flexibility for average human anatomical proportions and ranges of motion, and penetration resistance to ballistic strikes from small arms fire and blast fragmentation.

BACKGROUND OF THE INVENTION

Design factors in body armor include fiber durability, laminate durability, performance variability in large ceramic plates and low design margins that all contribute to reliability issues. Other specification issues include: cost, density and total system mass, flexibility, mobility, heat retention, and integration with load carrying systems. Testing on such systems includes testing of small arms and fragments such as: 7.62 mm caliber small arms threats including 7.62×39 mm M43 and 7.62×51 mm. Impact velocities may range from 500-1000 meters/second. Fragment threat simulators may be in the range of 2, 4, 16, 64, and 207 grains with velocities ranging from 100-1000 meters/second.

The current state of the art in rifle or small arms protection includes a large single ceramic plate typically of boron carbide ($B_4C$) bonded to a rigid fiber mass of unidirectional laminate material typically of Ultra High Molecular Weight Polyethylene (UHMWPE). These systems offer good performance for high energy fragmentation threats and for many of the various 7.62 mm caliber rifle rounds both with steel and other hard bullet core materials. The areal density of these plates is in the 4.5-8 lb/ft2 range. In most cases there is an additional backing fiber layer of Aramid woven or UHMWPE materials in the 1 lb/ft$^2$ range.

The result of attacks on U.S., coalition, and Iraqi personnel show that while armor systems are providing greater protection to the areas of body covered, the exposed areas in the sides, shoulders, upper thighs and neck account for a higher percentage of the battle injuries and fatalities. Clearly there is a need for a protective system that can extend the area of effective body coverage without disproportionately increasing the user's burden in terms of weight or limited flexibility.

Boron carbide ($B_4C$) is the material of choice for body armor because of its low density (2.52 g/cm$^3$) and extreme hardness. It is the third hardest material known after diamond and cubic boron nitride. Porosity severely degrades the ballistic properties of ceramic armor as it acts as a crack initiator, and unfortunately, $B_4C$ has historically not sintered well. Sintering aids, e.g. graphite, improve sintering but degrade hardness and ballistic properties. Thus presently, $B_4C$ small arms protective inserts for personal armor are hot pressed to minimize porosity, typically to about 98% relative density, yielding acceptable performance. However, commercial hot pressing requires nesting of parts, which restricts the shape of the parts to plates or simple curves. These plates protect only the essential organs of the body. The area of coverage of body armor systems could be extended to additional body parts if boron carbide armor could be produced cost effectively in complex shapes, and if a suitable design incorporating such materials could combine the requisite ballistic protection with sufficient flexibility, without a substantial weight penalty.

Traditional systems with overlapping armor elements have not been able to provide the sought-after degree of flexure with the required continuous protection across fold lines of the garment or panel. Moreover, overlapping ceramic systems suffer from very high mass per unit area, which translates into weight in the protective panel or garment.

SUMMARY OF THE INVENTION

In one aspect of the invention the Applicant has combined a unique set of technical features to achieve a multi-layer construction suitable for incorporation into a protective garment for the human body including extremities, that is relatively light and flexible in normal use, but highly resistant to penetration from a ballistic strike. Simply expressed, the invention employs in a solids layer, very hard planar elements arranged in a repetitive pattern, with edge and intersection protection, as a closely conformed but flexible mosaic array. The flexible solids layer is bonded between a highly elastic spall cover layer and a high tensile strength flexible backer layer, and that construction is further supported with a substantial fiber pack.

This system is highly sophisticated in its details and has a novel and remarkable response mechanism to a ballistic hit such as a bullet strike. The complimentary components of this flexible system are mutually supportive both in outward flexure for normal use, and under a strike impact causing compressive loading. The integrated construction reacts in the ballistic case with a progressive system failure mode that permits kinetic energy absorption via a dynamic internal mass transport and momentum transfer mechanism not heretofore recognized and exploited in the art.

It is useful to provide some definitions and explanation of some terms and abbreviations used herein relating to the invention. The term "ballistic" strike, event or projectile here refers to a projectile of 2 to 700 grains with an impact velocity ranging from about 300 to 1500 meters/second, and to hits from small arms munitions generally. Solid elements "SE," as are further described below, provide primary ballistic protection in a construction of the invention in the form of small planar components of composite construction occurring in a solids layer of the construction. Edge bars "EB" are elongate SE dividers, and have cross section profiles of conforming geometry to match and protect the edges of the SE and to provide or permit a degree of flexure to the SE layer. In some embodiments center buttons "CB" protect the rosette center or intersection of EB's and corners of adjacent SE from a ballistic strike and act to direct ballistic energy into the adjacent SEs. The radius of contact areas, and ratio of gap or contact height to gap width refer to the geometry of the relative placement and interactive response with respect to the edges of adjacent SE, EB and CB parts and flexing of the array.

The term spall cover or just "cover" used as a noun refers to a first or outer layer of a panel of the invention, such as an elastic knit layer covering the strike-face of the SE layer. The cover provides protection during ordinary usage and contains spall during strike events. "SE layer" refers to at least one layer of very hard SE elements and EB edge members arranged in a matrix or pattern that in conjunction with a flexible backing layer provides a suitable degree of flexibility to an otherwise very hard, strike resistant layer. A fold line in the context of the invention can be loosely defined as a straight line of EB's bisecting an array of SE's; but recognizing that there is actually an axis of flexure coincident with an SE interface or gap on each side of each line of EB's, where the EB mates with its abutting SE's. The term flex backer or just "backer" refers to a flexible backing layer such as a wovens layer, which by use of an adhesive matrix, bonds all the SE and EB parts together. The term "fiber pack" refers to a multi-layered assembly of loose woven or unidirectional fabric components that backs up the primary ballistic protection in a manner further described below. It is intended to further absorb and dissipate the remaining forward energy of the integrated mass and materials that pierce the preceding layers.

Some of the impact energy of a ballistic event on a construction of the invention is converted into in-plane stresses in the solid elements layer. These tensile forces tend to spread and disintegrate the SE layer and must be resisted by a matching compression in adjacent components. The energy of the projectile is $$E = \tfrac{1}{2} m v^2 \quad (1)$$

where $$m = \text{mass}, v = \text{velocity}, E = \text{Energy}. \quad (2)$$

In order to decelerate the projectile as it penetrates the SE layer this energy is distributed into the armor system in a number of ways. First, elements of the armor are accelerated by the force of the impacting projectile. The equation Energy=Force×Distance is applicable for this energy transfer.

The second type of energy transfer is the plastic deformation of the projectile and the solid element material. However there is a limit to the compressive force that the SE can sustain without a fracture failure. More deflection and energy transfer of the first type reduces the peek compressive stresses in the second type of plastic deformation of the impact surface pair. This effect is of particular importance in the 700-1000 m/sec domain for projectile velocity. At these speeds and energies $Al_2O_3$, $B_4C$, and other ceramics in the thickness of interest (5-8 mm) can crater and suffer breakage. If deflection energy can reduce the stresses to an equivalent value below this critical 700 m/s domain, then system mass and performance can be preserved. For example, in one case the deflection absorbs at least 20% of the projectile energy and is at least 25 mm in depth.

On the other hand, with reference to the FIGS. 7A-7E sequence, if the strike force is somewhat higher that the 700 m/s domain, it may be sufficient to trigger breakage or fracturing of the core of the impacted SE, deforming to some extent and yielding up some kinetic energy in the process. If then by design it is permitted to cause a progressive rending of the SE layer bonds and the high tensile flex backer in the periphery of the strike zone, it will yield up further kinetic energy in the process and transfer momentum to the fractured but still intact (in some embodiments wrapped) mass of the freed SE. The freed integrated mass of the target SE, intact by virtue of its wrap or other properties, and any free flex backer material associated with it, are transported with and ahead of the deformed and now slower moving projectile into the fiber pack, where the remaining kinetic energy of the total moving mass is absorbed, stopping the projectile. Among the other mechanisms at work here, it will be apparent upon inspection that there is a transfer of momentum occurring between the projectile and the materials carried forward with it.

The momentum of a system of objects is the vector sum of the momenta of all the individual objects in the system:

$$p = m_1 v_1 + m_2 v_2 + m_3 v_3 + \ldots + m_n v_n \quad (3)$$

where
p is the momentum,
$m_i$ is the mass of object i,
$v_i$ the velocity of object i, and
n is the number of objects in the system.
Force is equal to the rate of change of momentum:

$$F = \frac{dp}{dt}. \quad (4)$$

In the case of constant mass, and velocities much less than the speed of light, this definition results in the equation:

$$F = ma \quad (5)$$

commonly known as Newton's second law.

If a system is in equilibrium (i.e. no forces are being applied), then the change in momentum with respect to time is equal to zero:

$$F = \frac{dp}{dt} = ma = 0 \quad (6)$$

Momentum has the special property that, in a closed system, it is always conserved, even in collisions. Kinetic energy, on the other hand, is not conserved in collisions if they are inelastic. Since momentum is conserved it can be used to calculate unknown velocities following a collision. A common problem in physics that requires the use of this fact is the collision of two particles. Since momentum is always conserved, the sum of the momenta before the collision must equal the sum of the momenta after the collision:

$$m_1 u_1 + m_2 u_2 = m_1 v_1 + m_2 v_2 \quad (7)$$

where:
u signifies vector velocity before the collision, and
v signifies vector velocity after the collision.

The present invention is designed to make use of this physics in a useful and novel way. Relating force with momentum, we see that the desired effect is to have a projectile change its momentum so as to stop forward movement into the armor. The higher the momentum of the projectile, the higher the force imposed on the armor system. An armor system that must support very high forces must have very high bending stiffness, hardness and fracture toughness. This combination seen in SAPI (Small Arms Protective Insert) plates is by necessity a high mass solution. The hard layer in the present invention (herein sometimes referred to as the "Mosaic Extremity Protection" or MEP) is by design permitted a much higher range of motion, based on its flexible solid elements array. In embodiments, the SE components of the array are by design of an optimal mass according to the momentum matching concept, and are individually releasable from the array when struck during a ballistic event so as to become a mobile or transportable mass. The concept is here illustrated by example how the two masses of interest are related in a ballistic event just before impact:

$M_1 V_{1B}$=Bullet mass and velocity=0.009 kg×800 m/s
$M_2 V_{1S}$=SE mass and velocity=0.012 kg×0 m/s After the collision by conservation of momentum, ignoring other mechanisms at work, the integrated mass of the bullet and the SE must have the same momentum as the two have before the collision. The kinetic energy that is converted into heat, and to tension in the cover and backer layers, and other effects that are non-elastic such as fracturing of the SE core, are all valuable mechanisms of the system for stopping performance. However, if a degree of momentum can be retained in the system to accommodate a transporting of a struck SE forward a short distance into the under layers, one has effectively reduced the force on the SE at the first moment of the impact. Neglecting for simplicity the kinetic energy absorbed in the initial impact we have, for example, after the impact:

$M_1 V_2$=Bullet mass and velocity=345 m/s×0.009 kg
$M_2 V_2$=SE mass and velocity=345 m/sec×0.012 kg
$V_2 = M_1 V_1 / (M_{1+} M_2)$ Where $M_{1+} M_2$ is described as the integrated mass.

In actual impacts of this type, kinetic energy of the projectile is reduced somewhat in the initial strike, so velocity $V_2$ is actually an upper bound or ideal value excluding other losses. Assuming mass remains unchanged, the upper bound Velocity $V_2$ less the actual energy absorbed at initial impact, will yield a residual velocity $V_R$, which is lower. However, the benefits of considering momentum matching should now be clear. As the mass of the transportable SE drops, the retained velocity is increased. However, the important effect is two fold; retained velocity is higher, but the force absorbed at initial impact by the panel and in particular the SE, is lower. This understanding permits one to match or balance the energy absorption modes throughout the system, both at initial impact and thereafter, optimizing the materials performance of each system component and using the least amount of the more dense ceramic materials in the total system consistent with overall performance goals. It will also be shown that an integrated mass provides for low mass control of this residual velocity.

With respect to ceramic elements for ballistic protection, the use in various embodiments of boron carbide $B_4C$, aluminum oxide $Al_2O_3$ and silicon carbide ceramics in 5-8 mm of thickness in large plates offers performance in Small Arms Protective Insert (SAPI) type plate configurations. Embodiments of the instant design offer the benefits of ceramic without the mobility and coverage limitation of a rigid plate system. According to embodiments of the invention, the ceramic materials used are small, and in some embodiments they have complex shapes. However, $B_4C$ does not sinter well. During heat treatment, particles coarsen, attenuating the driving-force for sintering, via two mechanisms. At lower temperatures, an approximately 4 nm thick $B_2O_3$ coating on the particles facilitates coarsening through either liquid-phase diffusion or oxide vapor transport (the onset of sintering is also delayed until these coatings vaporize). At more elevated temperatures $B_4C$ itself forms an appreciable vapor pressure which contributes to coarsening. As temperatures approach 2150° C., sintering is rapid relative to coarsening as volatilization of $B_4C$ is nonstoichiometric, leaving minute amounts of carbon behind at the grain boundaries to function as a sintering aid. By soaking in an $H_2$-containing atmosphere at a temperature just before the onset of sintering, $B_2O_3$ is extracted, and then by heating rapidly through the temperature range in which coarsening (via $B_4C$ vapor) is rapid, relative densities were improved to 94.7%. By recognizing that the material rapidly de-sinters after terminal density is reached via abnormal grain growth and pore coarsening, relative densities were improved to 96.7%, yielding hardnesses on par with the commercially hot-pressed material. By centrifuging the raw material to eliminate the most coarse particles, relative densities of 98.4% were obtained. With the additional processing step of post hot isostatic pressing (post-HIP) substantially 100% dense $B_4C$ was formed. The FIG. 9 micrograph depicts on the left side the historically typical porous microstructure of pressureless sintered boron carbide. At right is the microstructure of theoretically dense pressureless-sintered and post-hot isostatic pressed boron carbide.

Post-HIPed pressureless sintered $B_4C$ has a substantially higher hardness than hot-pressed $B_4C$, resulting in lighter-weight armor for the same threat, or increased threat protection for the same weight. The process facilitates the ability to form complex shapes useful in MEP designs to protect a variety of body parts. Manufacturing costs and throughput of pressureless sintering, or pressureless sintering with post-HIP are attractive compared to hot pressing.

Ceramic layer design for kinetic energy dissipation will recognize that a significant portion of the kinetic energy from the bullet will accelerate the SE's. Based on the progressive failure mode designed into the system, significant displacement of SE components is possible. Increased displacement of components reduces peek compressive stress. A goal of the invention is to optimize the solid element mass to bullet mass ratio in order to accelerate the SE without excessive inertial forces.

Some embodiments of the present invention incorporate solid elements which are encapsulated within a fiber wrap. With respect to using a wrapped SE, it has been demonstrated in the Applicant's laboratory that encapsulating a ceramic element in a fiber wrap improves the ballistic performance of the ceramic. Although the strength of ceramic is highly pressure dependent, the amount of compressive stress that can be imparted to a ceramic core by using a fiber wrap is not very large compared to the pressures required to see significant enhancement in strength (several GPa). Further, the only appreciable axis of pre-stress are in-plane, and not in the through-thickness direction.

Other embodiments of the present invention incorporate solid elements which include compressive pre-stress due to heat shrinking of a metal layer about the SE's. Compressive pre-stress encapsulation is a mechanism that has many similarities to fiber wrap/encapsulation described above, but here we specifically refer to encapsulation by a metal that is heat shrunk on the ceramic core tile. Thin ceramic tiles typically fail in bending. Compressive pre-stressing on ceramic tiles may have a similar effect as on concrete beams used in civil engineering structures. Because the pre-stress is in compression, the brittle element must be taken through the neutral axis and into tension before it can fracture. Although this is true, the stresses encountered in ballistic impact tend to "overwhelm" the target, and a relatively small pre-stress has little effect for first impact performance. However, a compressive pre-stress may inhibit crack propagation, thereby elevating the peek force permitted in the initial impact and allowing use of a somewhat more massive SE, and consequently a lower residual velocity of the integrated mass. Metal encapsulation is generally heavier than equivalent fiber wrapping, but is an alternative or complimentary form of enhancement to the performance of a ceramic core SE.

Still other embodiments of the present invention incorporate ceramic solid elements which include a ceramic core and an outer ceramic layer, the outer ceramic layer having a higher coefficient of thermal expansion than the ceramic core. In some of these embodiments, the outer ceramic layer is applied as a glaze, while in other of these embodiments the outer ceramic layer is formed by doping the outer surface of the ceramic solid element to cause matrix substitution in the ceramic crystal structure. In these embodiments, significant compressive pre-stress is applied to the ceramic core as the surrounding outer ceramic layer cools and contracts after formation of the solid element.

Some embodiments include metal edge support components EB which are very dense and therefore have a heavy weight penalty. However metal edge constraints can offer un-matched toughness and ductile failure results. The heat-treating and TCE mismatch of metals and ceramics enables configurations that give some compressive pre-stress on the ceramic part.

The same thermal coefficient of expansion (TCE) mis-match techniques may be desirable in some embodiments for braising a steel containment tray embodiment where the use of very hard heat treatable steel forms a containment to support the ceramic core. Heat treating allows stamping or forging the steel while it is relatively soft, to create a tray or pan for a ceramic core, with post hardening for high strength and stiffness. Low elongation, high strength steel with good toughness would be suitable for some embodiments. The ceramic core may be brazed bonded to the metallic layer. The brazing sequence produces compression in the ceramic part, creating a thermal mis-match and the potential for exerting a pre-compression on the ceramic. The density disadvantage of steel may be overcome by utilizing this pre-stress condition.

Crack control, front face spall control, back face bending and spall control, bullet jacket stripping, and damping all play a part in the performance advantages of a wrapped ceramic core SE. There are three type of wrapping solutions; filament winding with single yarns which carry their required resin on to the part during the wrapping process; wovens with their fibers pre-impregnated with resin before wrapping; and woven or UDPE tapes pre-impregnated with resin that are wound on the ceramic parts. The form factors of the parts and the angles and wrap fiber cover density influence the choice of wrap. The criteria for selection of fiber types for wound or woven wrapping also include consideration of total ballistic benefit vs. mass, processing requirements, resin options, and surface bond quality. As a generalization, the current ranking of options may be stated as follows: UHMWPE fiber; para-aramid fiber; Carbon fiber; and PBO fiber.

Not all the candidate resin systems are compatible with all the fiber options. At one extreme is self bonding UHMWPE materials that have been used extensively in ballistic plate with and without ceramic. This system has the highest toughness. At the other extreme there are Toray carbon yarns with high strength and modulus in a high temp cure epoxy.

Bonding and resin must include optimization of the ceramic-resin interface. A modulus match transition is used to make this work. Very high shear bond strengths (400-1000 psi) deliver the best ballistic performance. Also, the environmental performance of the assembly requires this kind of high performance bond. The matching of the basecoat system to the ceramic and the ceramic surface preparation is defined by the Van Oss surface criteria for adhesion. The adhesive joint between the fiber wrap and the ceramic must have two modes of performance, first for the armor system to be practical it must control and maintain position of the SE configuration for years of use and abuse. Secondly it must be designed to permit the designed controlled progressive failure shown in FIGS. 7A-7E. As the ceramic fractures the wrap must stay intact. The containment of the SE in the fractured state is based on the bonding of independent layers of the wrap surviving the ballistic impact when the ceramic to wrap bond does not. Because of the modulus mismatch this condition is met with the materials described in this description.

Because the ceramic components in some embodiments must fit together with considerable accuracy after the application of the fiber wraps, the final control of shape uses a female mold for curing of the fiber wrap resin. This approach offers not only the best control of part geometry but also excellent control of the resin fiber ratio.

Some embodiments of the invention utilize a ceramic core with a filament winding as a method of wrapping and encapsulation of the ceramic. This technique is more easily employed using square core elements. An edge wrap or package wrap may deliver superior edge performance for this embodiment. The use of high shrink epoxies with a filament winding offers the opportunity to provide pre-compression of the ceramic core. The use of UHMWPE as a wrapping is also effective. This material does not lend itself to providing a pre-stress benefit, but its very high mechanical performance is an advantage for first impact strength for momentum transfer and encapsulation of the integrated mass. The low density of this material offers further advantages for mass reduction in the system. Bonding of this material to the SE components is facilitated by the use of low melt temperature olefin resin adhesives. As in the case of the other wrap methods, the winding may be a continuous encapsulant around the ceramic.

Embodiments of the MEP armor system of the invention work in part because the mass of the SE, to include its fiber or other wrapping if any, is matched to the mass of the threat projectile, reducing the force required to move the SE. It may seem a paradox that one would want to reduce the force required to move an SE rather than increase the stiffness of the SE layer. However, it is an object of the invention to reduce the overall mass of the protective system and increase its flexibility for the wearer. This is achieved in part in various embodiments by keeping the momentum match relatively high or close, and keeping the SE in front of the bullet. The forces between the bullet and the ceramic reach the fracture load and a conical-radial fracture is developed in the ceramic prior to release of the SE from its position in the solid element array. In addition, ceramic is fractured to a sand-like powder directly under the tip of the bullet. This is comminution. In the case of the larger SAPI plate, the combination of conical radial failure and comminution permits an opening to be formed and the bullet passes through the opening. But with a construction in accordance with the invention, the bullet does not pass through the ceramic SE. By matching the masses appropriately the force to move the SE is reduced in various embodiments, the system configured to release the SE from the array at a design force level, and this permits the SE to move with the bullet and continue to transfer energy from the combined mass of the bullet and the SE by additional methods, including engagement with the loose fiber pack.

The power of this concept can be shown by observation of ballistic strikes on the large SAPI type ceramic plates in common use. In this example, the SAPI plate generally has a mass greater than 2000 g, while a typical ballistic threat such as the 7.62×39 mm has a bullet mass of approximately 9 g. In this example the momentum matching between the bullet and the plate is poor, less than $1/200$. The plate is not able to be accelerated by the bullet force, and consequently the ballistic strike fractures a hole in the plate. This does not maximize momentum transfer between the bullet and the plate materials.

In contrast, in accordance with the invention, the optimal design mass of a wrapped SE mass might be 4-15 g which matches the typical threat bullet and fragment masses and would in theory double the mass and reduce velocity by one half. Of course, there are other variables and considerations to the optimal design of SE size and mass. For example, the size of the SE should be keep as large as practical in order to control the cost of manufacture. Moreover, the capacity of ceramic to resist the initial impact force is high enough that lower mass SE components and higher residual velocities for the integrated bullet+SE mass are not required.

A solids layer of primary ballistic protection in the form of a sophisticated mosaic of wrapped, mutually supporting ceramic elements according to the invention provides a continuous layer of ballistic protection over a useful range of panel flexure while, when the system takes a design level ballistic strike, individual solid elements of the array retain their unitary mass and volume when fractured, due in some embodiments to their wrapping. These individually wrapped ceramic components are forcibly released from their position in the mosaic and accelerated by the ballistic impact, the system thereby exhibiting a progressive failure mode that more efficiently captures and dissipates the kinetic energy in a ballistic projectile. In accordance with the invention, as much as half of the remaining kinetic energy of the bullet may be transferred to the ceramic element and both the bullet and the commutated wrapped ceramic are then captured by the soft ballistic fabric layers at the back end of the system. The actual point of release and the residual velocity can be confirmed by normal use of a second set of velocity measurement devices in a ballistics laboratory. This test is performed without the fiber pack with the ballistic impact only on the elastic spall, the solid elements and the bonded backer. The first set of velocity units measures the strike velocity the second set measures the residual velocity of the integrated mass.

As described, the mosaic array of solid elements may be bonded between an elastic spall cover and a flexible backer. This assembly may be yet further supported by a generous fiber pack such as a multi-layered assembly or fiber pack of loose woven or unidirectional fabric that completes the ballistic protection system. There may be other and addition components to the system that contribute to providing a light weight, flexible panel design that may be configured to extend to cover more of the body and body extremities without gaps or seams, with an adequate range of flexure to permit relatively unimpeded motion.

In yet another aspect of the invention, a mosaic-flexible armor system may combine composite yarn technology with a flexible, composite, solid-element component to produce a mosaic-flexible armor panel system. Due to the limited supply of small-denier aramid materials, the Applicant has developed a novel approach to use more readily available resources. The Applicant has designed a new weaving method that combines a larger-denier filament yarn with a fine-staple spun yarn. Fibers are woven end for end to increase stability. By using the smaller staple yarn to fill the gap between the large-filament yarns, greater fiber cover, and therefore greater stability, is achieved. The fine-spun staple yarns also help to decrease the overall weight. The Applicant has successfully achieved 9 mm ballistic performance typically found in 400 denier aramid yarn vests by weaving 840 denier filament and 140 denier aramid staple yarns. Based on its work to date, Applicant expects to achieve the performance equivalent to 235, 285, and 335 denier filament yarns by weaving 400-600 denier filament with 70 denier staple spun yarns. In addition, this weaving technology can be applied to leverage the newest filament yarn materials such as M5. This weaving method makes the best use of the heavy denier yarns that are just becoming available in these materials. Applicant's references herein to the use of composite yarn technology is intended to mean the combining of larger-denier filament yarn with staple yarn of relatively lower denier such as by at least 50% and/or 200 denier lower.

An individual solid element (SE) of the mosaic array, in the context of the invention, has a polygon shape with straight line edges. A solid element of the invention is not limited to one shape. For example, an array of triangular elements has three sets of parallel hinge lines or directions or degrees of flexibility for wearing comfort and kinetic ballistic flexure. An array of hexagonal elements has no perfect fold or flex lines in the context of the invention, in that there is no inherently smooth hinge line direction common to multiple, adjacent SE's in an all hexagon array. That is not to say that a hexagonal array configuration would exhibit no flexure; however, assuming the solid elements to be unyielding, it would necessarily require a greater yielding of the flexible backer and bonding mechanism than otherwise.

An array of squares has two sets of parallel fold or flex lines oriented at right angles. This provides a greater degree of bending flexure which allows for more system deflection under impact than a hexagonal array. A higher density or closer spacing of flex lines in each flex direction improves mobility and comfort. Some shapes, such as a square shape, may have practical benefits in terms of cost and manufacturability, compared to other shapes. It is clear that the geometry of the SE planer array has a significant impact on the flex characteristics and other aspects of the full system. The size of the elements determines the density or spacing of flex lines in each direction. The non-destructive, operational angular limit of flexure of each adjacent flex line in normal use, in combination with fold line spacing or density, defines another aspect of an armor system's limitations as to its radius of bending to conform to user motion.

The present invention is an armor system for protection from a ballistic strike by a projectile. The armor system includes a plurality of solid elements maintained by a supporting structure in a flexible planar array, the planer array having a strike side and a back side, each of the solid elements being separable from the supporting structure upon impact on the solid element by the projectile, and upon impact by the projectile and separating from the supporting structure, each of the solid elements having material properties causing it to combine substantially all of its mass with the mass of the projectile, so as to provide a reduced velocity and an enlarged impact area of the combined solid element and projectile, as compared to an impact velocity and impact area of the projectile alone.

In some embodiments, the supporting structure includes a flexible backer fabric layer bonded by an adhesive matrix to the back side of said planar array, the flexible backer fabric layer being configured to fail in tensile upon impact on the solid element by the projectile.

In other embodiments, the supporting structure includes a flexible, elastic cover layer bonded to the flexible planar array on the strike side of the flexible planar array. And in some of these embodiments, the flexible, elastic cover includes a fibrous layer with an elongation of at least 50% at less than 100 lbf/inch.

Various embodiments further include a multi-layered fiber pack of high tensile fibers configured so as to be impacted by the combined solid element and projectile after separation of the combined solid element and projectile from the supporting structure. And in some of these embodiments the fiber pack includes multiple fibrous layers of up to 1.5 lb/ft² total density, the layers including ultra high molecular weight polyethylene material.

In certain embodiments at least one of the solid elements includes at least a core element of ceramic material. In some of these embodiments the fracture load of the ceramic core element of the solid element is lower than the force required to separate the solid element from the planar array. In other of these embodiments the force required to separate the solid element from the planar array is sufficient to commutate the ceramic core element of the solid element. In still other of these embodiments the core element of ceramic material of the solid element includes boron carbide, and in some of these embodiments the boron carbide includes post-HIP boron carbide.

In yet other of these embodiments the core element of ceramic material of the solid element is surrounded by an outer layer of ceramic material, the outer layer of ceramic material having a coefficient of thermal expansion which is greater than the coefficient of thermal expansion of the core element of ceramic material of the solid element, the outer layer of ceramic material and the core element of ceramic material of the solid element being cooled from an elevated temperature so as to cause the outer layer of ceramic material to apply a compressive force to the core element of ceramic material of the solid element. In some of these embodiments the outer layer of ceramic material is applied as a glaze to the core element of ceramic material of the solid element. In other of these embodiments the outer layer of ceramic material is formed by doping an outer portion of the core element of ceramic material, so as to cause matrix substitution in the crystal structure of the outer portion.

In yet other of these embodiments each of the solid elements includes a layer of titanium attached to a back side of the solid element.

In various embodiment each of the solid elements is shaped substantially as a rectangle having a width of substantially 1 inch and a length of between 1 inch and 2 inches.

In some embodiments each of the solid elements has a thickness of between 5 mm and 7.5 mm. In other embodiments the planar array includes a single row of aligned, adjacent solid elements. And in certain embodiments the planar array includes a plurality of rows of aligned, adjacent solid elements.

In embodiments, each of the solid elements is shaped substantially as a planar polygon, the planar polygons being arranged in the planar array with aligned, adjacent edges. Some of these embodiments further include edge bars attached by an elastomeric adhesive to the strike side of the planar array, the edge bars being positioned so as to overlap junctures between the aligned, adjacent edges of the solid elements. In some of these embodiments at least one of the edge bars is rectangular in cross section. In other of these embodiments at least one of the edge bars has a cross sectional shape which is thickest in a region directly over the juncture between the solid elements and thinner in regions offset from the juncture. In still other of these embodiments each of the edge bars has a length which is equal to the length of the juncture which it overlaps, so that the edge bar does not extend beyond the juncture which it overlaps.

In certain of these embodiments wherein each of the edge bars includes at least a core element of ceramic material. In some of these embodiments each of the edge bars includes a layer of titanium interposed between the edge bar and the strike surface of the planar array of solid elements. Other of these embodiments further include center buttons attached by an elastomeric adhesive to the strike side of the planar array, the center buttons being positioned so as to overlap intersections of the junctures between the aligned, adjacent edges of the solid elements. In some of these embodiments each of the center buttons includes at least a core element of ceramic material. And in other of these embodiments each of said center buttons includes a layer of titanium interposed between the center button and the strike surface of the planar array of solid elements.

Other aspects, objects, and advantages of the invention will be readily apparent to those skilled in the art from the figures and detailed description that follows.

BRIEF DESCRIPTION OF THE FIGURES

FIG. 3 is a partial top view of a section of a planar array of solid elements assembled with edge bars and a center button;

FIG. 3A is a section view of FIG. 3, taken through the center of the edge bars and center button;

FIG. 3B is a section view of FIG. 3, slowing the solid elements with rounded edges of uniform radius and cross section of the edge bar with its undercut sides of uniform radius for rotational fitment with the abutting solid elements;

FIG. 4 is a perspective view of an edge bar or EB of one embodiment of the invention, illustrating the three faces on each end; two at 45 degrees respectively for mating with intersecting EB's and a 90 degree center face where the EB mates with one face of the square shank of a center button or CB;

FIG. 5 is an end view of the EB of FIG. 4, illustrating its over-arching or cantilevered profile with curved contact surfaces for mating with adjacent SE's;

FIG. 6 is a perspective view of a center button or CB, illustrating the square shank for mating with the squared-off ends of EB's and the oversize truss-type head for extending protection to cover the full area of EB intersection;

DETAILED DESCRIPTION OF THE INVENTION

The invention is capable of numerous embodiments. What is shown in the figures and described here is intended to be illustrative but not limiting of the scope of the invention.

Figure 1:
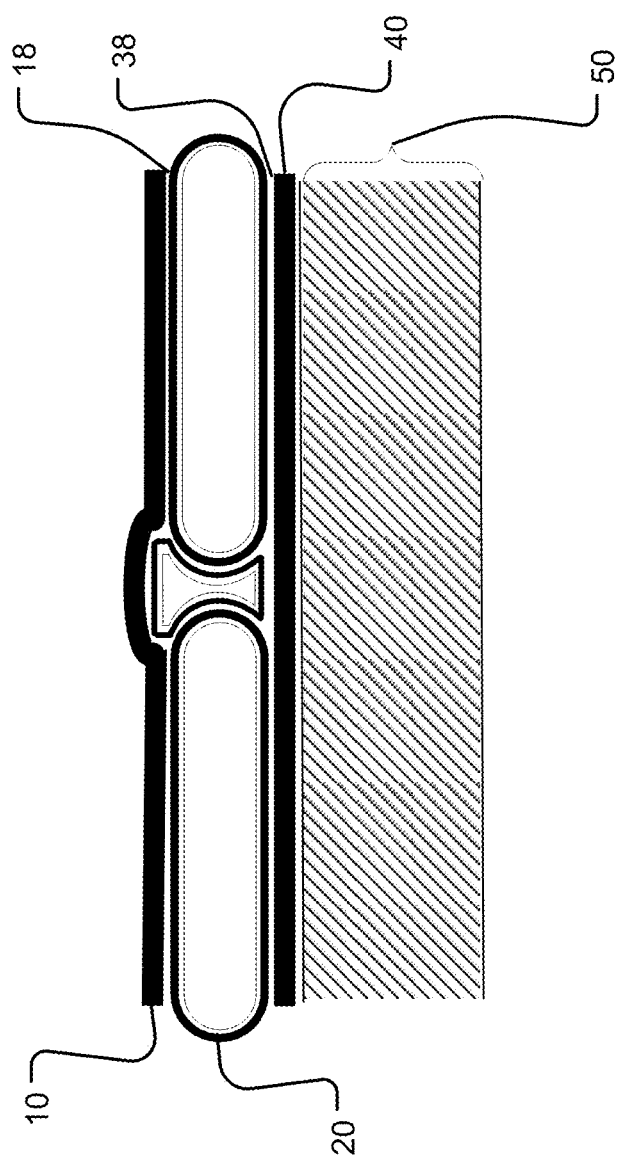
FIG. 1 is a cross section view of one embodiment of the invention, illustrating its four major components; a cover layer, a solid elements layer, a flexible backer layer, and a fiber pack layer.
Figure 2:
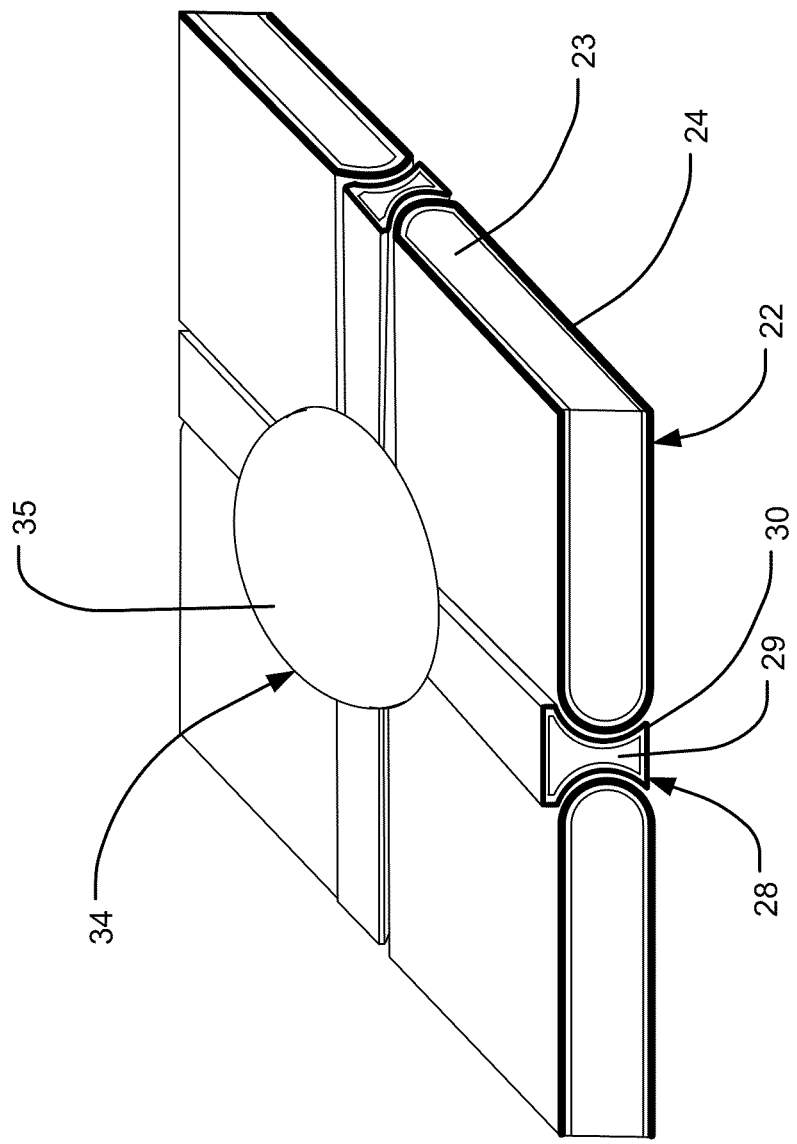
FIG. 2 is a partial, perspective view of an area of an SE layer in one embodiment of the invention, illustrating SE, EB and CB components and their relative placement in the SE layer.

Referring to FIG. 1, there is illustrated in cross section a first embodiment of a mosaic-flexible armor system or panel of the invention, illustrating its four major components; cover 10; a solid elements SE layer 20; flexible backer 40; and fiber pack 50. These component layers of the panel each as independent characteristics contributing to system performance, but it is the integrated response of the four components to both (1) the ordinary event of regularly donning and wearing of such a system for personal protection and (2) the extraordinary event of a direct ballistic strike, that is most remarkable.

Cover 10 is a spall cover layer and the outer layer of the panel of FIG. 1. The flexure of the array of solid elements is enabled, in part, by the use of an elastic fiber spall cover layer. This relatively elastic component of the panel system permits the joints in the SE array to rotate and flex with the flexure of the inelastic backer to which they are bonded. The flex backer materials are high in modulus and tensile strength, typically at least 23 gpd with elongation of not more than 4% at break. Without an elastic cover 10, the SE array would be rigid.

In ballistic performance, the system is improved by the damping of the spall cover. In this embodiment urethane and nylon fibers are knit into a stretch fabric that has at least 100% elongation. This elongation must be possible under a relatively low load. If modulus of this material is too high then the flex of the armor will feel stiff to the user. A suitable but not required level of modulus is that the 50% point is reached at 10 lbf per inch of cover and preferably much less than 10 lbf. Cover 10 fabric is assembled to the SE layer 20 array with an elastomeric adhesive sublayer 18. The combination has high historisis and damping. The combined fiber and matrix system of this embodiment has very high toughness. The area under the tensile curve is large. The combination of knit elastomer yarns, nylon yarns and elastomeric adhesives ensures that this elongation to break criteria is at least 100% and the load at break is at least 60 lbf/inch of spall cover for this embodiment.

The spall cover provides further contributions to the design of a practical MEP (Mosaic Extremity Protection) array. The ceramic components must also be protected from external environmental damage. The stretch fiber cover 10 and the elastomeric adhesive sublayer 18 by which it is bonded to SE layer 20, offer very good environmental aging performance. Use of a bonded spall cover enlarges the bond area and volume, contributing to a fuller encapsulation of the SE array for improved retention of the ceramic parts and integrity of the array during a ballistic event. The dynamic stiffness of this system under ballistic impact is relatively high, while resistance to intended flexure at the rate of human motion is relatively low.

Still referring to FIG. 1, SE layer 20 of this embodiment consists of a mosaic or matrix of components illustrated in more detail in FIGS. 2-6, including solid elements having a normalized hardness that may be 30% or more greater than the hardest component in the projectile. Solid elements SE 22 are interposed with edge bars EBs 28 and center buttons CBs 34 of such geometric shapes and in such patterns as to form a very tightly joined array of overlapping components that in conjunction with flexible backer 40 to which the array is bonded by adhesive matrix sublayer 38, provides a useful range of flexibility to an otherwise very hard, strike resistant layer of the panel of this embodiment. The SE layer 20 components and geometry, and its role in this and other embodiments of the invention, are later described in more detail.

Flex backer 40 of this embodiment is a multi-layered assembly, contributing to both bending and ballistic performance of the MEP armor technology. Backer 40 provides the tensile strength to keep the solid elements in lateral position, keeping the SE array intact for maximum resistive performance under the high forces encountered in ballistic impact.

Figure 8:
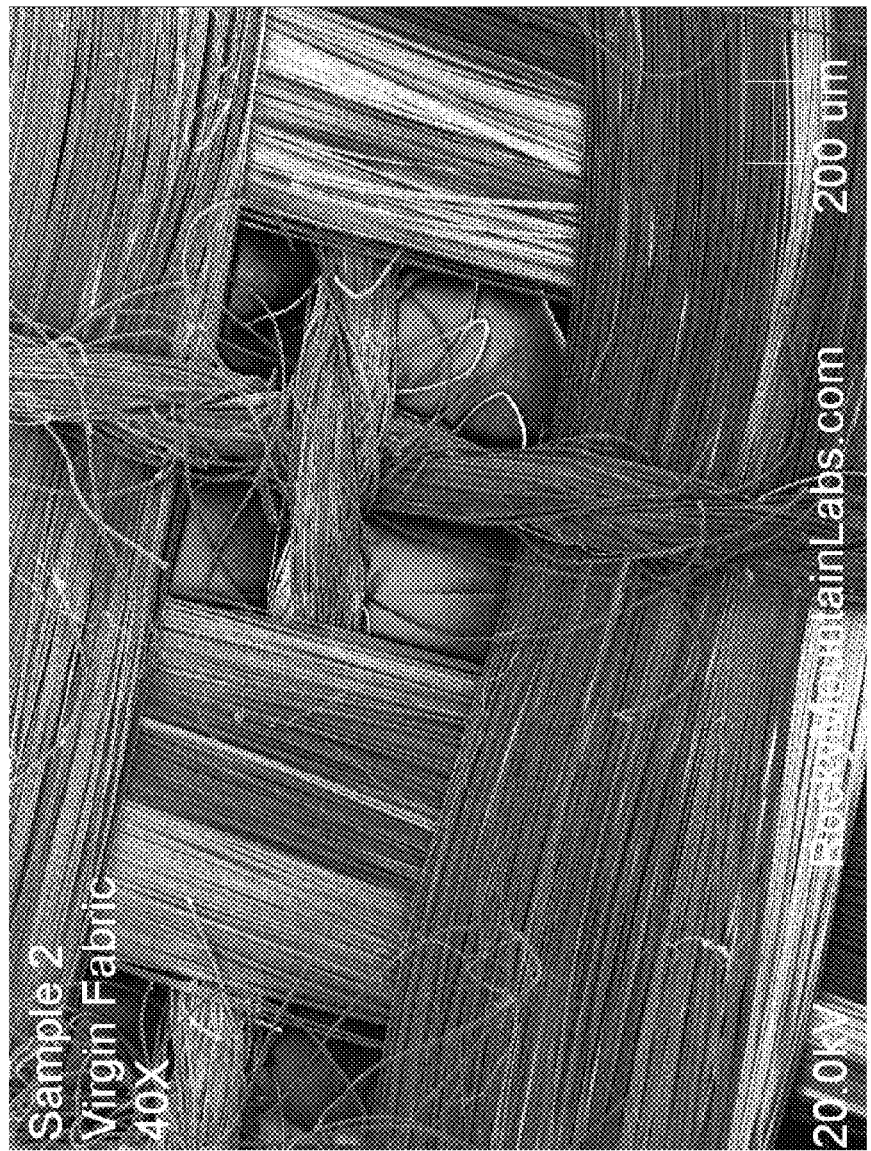
FIG. 8 is a micrograph of a composite yarn construction of 840 denier filament & 140 denier staple yarns.
Figure 9:
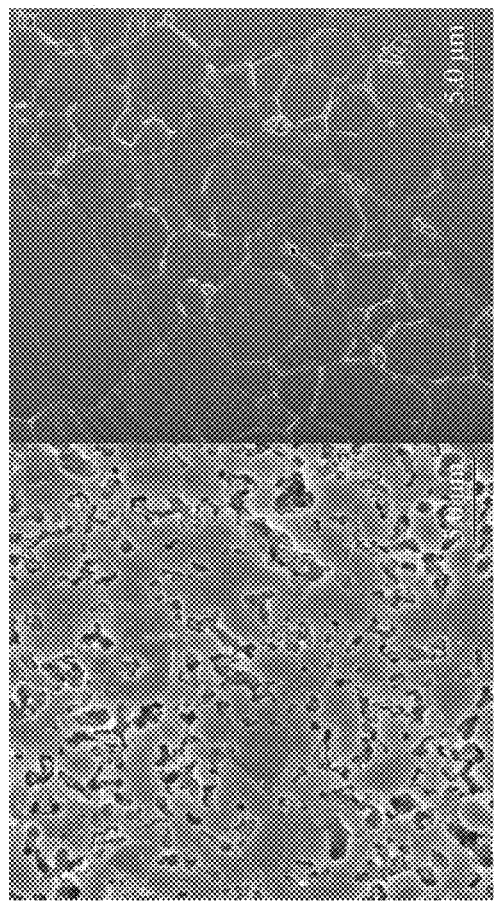
FIG. 9 is a side by side pair of micrographs; the left side displaying a porous microstructure of pressureless sintered boron carbide; the right side displaying pressureless-sintered and post-hot isostatic pressed boron carbide.

Another mechanism at work during a strike on the panel is the resistance to inward deflection of the ceramic array at the point of impact by the creation of or increase in compression between the solid elements and tension placed on the flex backer. Referring to FIG. 8, there is presented a microscopy of composite yarn construction of 840 denier filament & 140 denier staple yarns that in this embodiment provides enhancement of the ballistic performance in backer layers. Other useful variations on flex backer construction include a composite yarn with 400 d and 70 d staple yarn Aramid materials; and a composite yarn with 375 d and 650 d and 70 d staple yarn mixed UHMWPE and Aramid. FIG. 8 discloses one example of the weave construct, integrating unidirectional layers of UHMWPE non-wovens with composite yarn wovens.

Referring again to FIG. 1, the flex backer 40 of this embodiment is a fabric of a woven aramid configuration, conjoined with a cross-linkable elastomeric matrix sublayer 38 for providing the bonding function with the components of SE layer 20. Elastomers have high specific sheer, impact toughness and unparalleled environmental durability. The backer system is integral to the flexibility and ballistic performance of the armor panel. Backer 40 provides the tensile strength, transferred through the bonding sublayer 38, to maintain the integrity of solid element array geometry, and must provide enough stiffness and resistance to lateral displacement of SEs, to maintain the compressive support between the SE, EB and CB components during neutral or negative flexure. This connection is formed by the use of high strength adhesives for bonding sublayer 38. Useful adhesives include Poly, ether urethanes, Neoprene materials or Olifin hot melt adhesives. The adhesive bond sublayer 38 between the SE layer and the flex backer must have high shear strength to resist the loads imposed during a ballistic event. This bond is measured in a lap shear test on a tensile testing machine such as an Instron Tester.

A representative sample is taken of the backer and the solid bonded as in the armor system. The solid element is placed in one jaw of the tester and the flex backer is placed in the other jaw of the tester. The test is made by pulling the jaws apart as under a typical tensile test. The peak tensile force is recorded and the force is divided by the bond area of the sample in inches square. A bond strength in lap shear of 100 psi is useful. Although lower results may be acceptable in some cases, greater strength is obviously better.

The bonding of SE layer 20 to backer 40 in this manner permits a useful range of outward flexing of the panel during ordinary donning and wearing motion by operation of the gap expansion and joint rotation, while providing great resistance to any lateral displacement of SEs 22 within the panel during a ballistic strike and the resulting reverse flexure and progressive failure mode of the layers of the system. The full significance of using individually wrapped ceramic SEs configured with EBs for continuous surface coverage, constrained from ready lateral displacement in the panel by the backer when taking a ballistic strike, while being momentum matched and separable under sufficient force for individual mass transport forward into the fiber pack, is not readily apparent but will be further described below and illustrated with reference to FIGS. 2-6 and the sequence of FIGS. 7A-7E.

Fiber pack 50 in this embodiment is an assembly of loosely woven or unidirectional fabric elements which use a composite yarn of 400 d and 70 d staple yarn of aramid materials. The base fabric is 2.5 oz/yd$^2$ and a fiber pack of greater than 1 lb/ft$^2$ is required for the 7.62 mm rounds. With more fiber required for bullets with harder core elements (AP types). The fiber pack is intended to provide a deep, strong net, able to catch and trap the ballistic projectile and associated forward moving mass yielded by the preceding layers, thereby absorbing and dissipating the remaining energy.

The novel composite yarn technology employed in the fiber pack of this embodiment offers the potential to leverage the use of large-denier ballistic yarns, which are more cost-effective to produce in volume, to yield a ballistic performance comparable to a yarn of nearly half that denier. 200 denier yarns are not readily available for ballistic use in production quantities and in all likelihood these yarns will not soon if ever be cost effective for armor. Composite yarn weaving as described previously herein offers the possibility of using 400-600 filament with 70 staple spun yarns to achieve a respective ballistic performance one might anticipate from roughly 200-300 d denier filament yarns. Applicant has successfully achieved 9 mm ballistic performance typically found in 400 denier aramid yarn vests by weaving 840 denier filament and 140 denier Aramid staple yarns, using this novel composite yarn construction.

Fiber pack 50 in another embodiment uses a composite yarn with 650 d and 70 d staple yarn mixed with UHMWPE in the form of Unidirectionals (PEUD). The PEUD materials may sandwich the woven fiber. One embodiment may use a mass configuration of dividing the 1-1.5 lb/ft$^2$ mass into 3 layers in a configuration of ⅓-⅓-⅓ for the pack with PEUD/aramid wovens/PEUD as the layup. Other configurations are within the scope of the invention.

Referring to FIGS. 2-6, and 9 and SE layer 20, in one embodiment, the SE's are ceramic elements which may take either or a mix of at least two forms. First, the SE has an outline or shape defined by intersecting straight line edges, such as a square or a triangle. Other polygon shapes are possible. Adjacent solid elements 22 are separated by an edge bar 28 that supports and protects the edge of the SE from premature failure. A center button 34 is provided at each corner intersection of SE's and EB's.

Assurance of predictable performance wherever the strike occurs on the panel, and conversion of compression and tensile forces in the SE/flex backer composite layer when the strike occurs irrespective of the degree of flexure (within design limits), requires critical geometry and gap control throughout the solid element array. Various alternative schemes for mechanical engagement between the edge bar and the solid element are possible particularly with the tight gap & edge shape control between SE, EB and adjacent SE. The SE-EB interface requirement offers a number of related configurations. A preliminary requirement is to provide for rotational engagement of the SE/EB/SE to permit flexing of the panel in normal use. A round edge of uniform radius on the SE and a matching groove on the side of the EB is one way to facilitate that need. The interface can rotate with flexure and open slightly with extreme bending. For strike resistance, this same geometry provides for mutual compressive engagement of the SE's with the dividing EB. The interface may have a tapering or uniformly curved critically small gap or actual interference fit or compression fit between the SEs and the EBs. In one example, the design interference in a zero-flexure condition is approximately 1 mm. This compressive bias tends to preload the finished assembly such that outward flexure is eased.

The array of solid elements is referred to generally as being "planar" in nature. But this refers more to the edge to edge relationship between adjacent solid elements and should not be interpreted so broadly as to limit the shape of the overall array and armor panel to being a flat structure at zero flexure. The geometry of a MEP solid element array panel of the invention may have an initial simple or compound curvature or arc built into the design at the time of assembly in order to fit the surface profile of a particular body area. The profile of the panel as constructed, is by definition the zero-flexure condition, unless stated otherwise. This is the profile where the SE layer 20 geometry is optimized in accordance with the invention; and the point from which the range of working flexure and the response to a ballistic hit are both generally described.

Because of the critical geometry of the SE array and requirement for consistency throughout the panel the components should have good dimensional repeatability. A rigid fiber cover molding can contribute to that goal. After the green cover fiber and resin are applied, the SE parts are cured in a mold tooling. The molding tooling controls both the dimensions of the part as well as the resin to fiber ratio.

Each SE 22 consists of a ceramic element 23 enveloped or wrapped in a wrap 24 of one or more layers of fiber and/or metallic materials. In this or other embodiments, there may be employed a Rigid Fiber Wrap (RFW) as the wrap 24 for the SE, and similarly for the EB and CB components. A light weight RFW cover layer has been shown to prevent premature compressive failure in the ceramic elements. A high pressure laminate of aramid, UHMWPE or PBO offers a lightweight opportunity in this regard. As a percentage of overall mass, an RFW of 5%-20% by mass has been shown to be effective. While the flex backer 40 layer provides some tensile support to the SE's under bending stress on impact, rigid fiber wrap have lower elongation and offer a better match to the ceramic to reduce bend strain at impact. Among the fiber options for the rigid covering wrap on SE are para-aramid, LCP (liquid crystal polyesters) polyesters, UHMWPE, PBO and Carbon yarns. The covering wraps can be formed using filament winding, tape winding, wrapping of woven materials or combinations. An important requirement is tensile strength to resist premature tensile related breakdown and penetration or disintegration of the SE packet, in order to permit the formation of the integrated mass of the SE packet with the bullet after break though and release from the fiber backer. In one embodiment the fiber material of the RFW has at least 23 gpd of tenacity and at most 3.5% elongation to break. The density is at least 30,000 denier per inch of SE edge length and in some designs as much as 200,000 denier per inch of SE edge length.

A second important requirement of the rigid fiber wrap is the retention of spall and the control of crater depth formation at the ballistic impact. For tensile reinforcement of the SE edge, unidirectional tapes or filament winding are desirable but not required. For the control of the impact crater, woven materials are preferred but not required.

A fiber wrap on the ceramic core results in a substantial improvement in multi-hit performance in part because it does not allow the ceramic core, although cracked, to separate into pieces and damage surrounding ceramic elements. One of the novel elements of this invention is the degree that ballistic impact damage is restricted to the ceramic components directly impacted and no damage is seen in the surrounding mosaic. Fiber warp also improves first-hit performance. According to the invention, the sizing and fiber wrapping of the SE ceramic core, utilizing principles of momentum matching with respect to the SE 22 and the design bullet, enables a multi-faceted, kinetic energy absorbing response to a ballistic strike. It reduces the force required (relative to larger plates) to release an SE 22, with its mass intact due to the wrap, from the grip of sublayers 18 and 38 and the close fitting geometry of the SE layer 20 array in order to accelerate the mass of the SE forward in front of the deformed bullet, thus increasing the mass component of the kinetic energy equation and therefore reducing the force in the secondary penetration event However, the force required to free an SE 22 is not less than that required to first fracture the ceramic core of the wrapped SE 22. Also, the force required to overcome the tensile strength/SE area needed to rupture the flex backer and allow the mass of the fractured, but still wrapped SE and the bullet to move forward to enter the fiber pack must be greater than the force required to fracture, and then free the SE 22 from the array. The remaining kinetic energy in the combined mass of the SE and the bullet is finally exhausted in the multiple layers of high strength fabrics spread over a much larger area of this fiber pack.

It will be readily apparent from the discussion above that for the embodiment described, there are several energy absorbing mechanisms at work in a progressive mode of localized panel failure during a ballistic strike, including: (1) the ballistic projectile penetrating the spall cover; (2) the projectile fracturing the SE during initial deformation; (3) the deformed projectile accelerating the fractured but still wrapped SE before it so as to (4) rend bonding sublayers 18 and 38 and flex backer 40, thereby freeing the fractured SE from the array; and (5) the integrated mass of the deformed projectile and fractured SE with rent flex backer material before it being received and stopped by the flexible fiber pack. These mechanisms are integral to the MEP design and technology described and illustrated herein, and additive in their effect on the total performance of the panel.

Still referring to FIGS. 2-6, in this embodiment, the ceramic elements take the three principle forms illustrated. First, SE 22 elements are most likely to be square as here, or triangular, although other shapes are possible. The edge bars EB 28 support and protect the edge of the SE from premature failure. At the apex of the SE and EB pattern, there is a circular center button CB 34. All three of the SE, EB and CB components in this embodiment have core elements and wrapping layers of fiber and/or metallic materials, although in other embodiments some components may not, or may be partially wrapped or covered. These added layers provide improved resistance to brittle failure in the ceramic. In addition, a wrapped SE or EB is combined as part of an integrated mass and facilitates momentum transfer to the fractured ceramic by encapsulation of the ceramic to retain its unitary mass.

The solid elements cover the majority of the area of coverage provided by a panel of the invention. The edge joints and apex geometry for the SE array is important both to ballistic performance as well as for maintaining flexibility. For this reason it is desirable to optimize the geometry of the SE for shape, area size, thickness and edge profile. The manufacture of these complex shapes is straightforward as a pressureless sintered part, in the manner described above.

In another embodiment the ceramic core SE 23 is wrapped with strips of UHMWPE UniDirectional (PEUD) materials. The wrap thickness is typically from 1 to 4 mm. The wrapped package can be hot pressed or HIP using the same conditions typically used for bonding and forming PEUD plates; 250 f and 200-5000 psi are typical conditions. It is very important however to have the wrap be continuous and not stop at the SE edges. It is through the use of a containment package for the brittle core element, that the momentum transfer mechanism described can be optimized.

Referring again to FIGS. 2-6, the presence of wrap 24 provides improved resistance to brittle failure in the ceramic element 23, and contains the failed ceramic core or element as a unitary mass for forward transport into the lower layers of the panel. Edge bars 28 of this embodiment consist of core elements 29 and edge bar warp 30, similar to the configuration of the SEs. Center buttons 34 have a truss head 35 of sufficient diameter to cover the intersection of EB's, and a smaller square shank 36, each face of which abuts the square end portion of the intersecting EBs, when the array is assembled. CBs may have a full or partial CB wrap 37, similar to the wraps described for the SEs and EBs.

Referring to FIGS. 1 and 3 in particular, the edge profile of the SE's in this embodiment is semicircular. The EB cross section is somewhat T shaped with a semicircular undercut to both sides of the T profile. The radius of the undercut is about the same as the uniform radius SE edge profile, so that there is a closely conforming and rotationally effective fit with none or a very small gap between the SEs and the EB. In this embodiment employing wraps on the SE and EB components, there is actually a small overlap by design between the SE and EB. This full radius interface helps protect the fiber in the wraps of each component from compressive damage in the first part of a ballistic strike.

Outward panel flexure is designed to be distributed across several fold lines in the SE layer 20. A small amount of outward flexure of the bonded backer 40 along several adjacent fold lines will rotationally relieve the interference fit and/or separate the edge or contact surface of the SEs from the undercut surface of the EB a few degrees. However, due to the relatively small angle and curvature of any one fold line opening created by the distributed outward flexure, and the still present overhang of the T ends of the EB, the overall integrity of the panel against a ballistic strike within its design limit is not significantly affected by the distributed flexure.

The wraps on the respective SE, EB and CB and the geometry of their placement in the array are more significant from a defensive perspective and reverse flexure or strike response analysis. The tensile strength of these covering layers on the ceramic components provides for significant damping and edge constraint in tensile loading of the backer 40. Further, upon ballistic impact sufficient to cause the brittle ceramic element 23 to shatter as it absorbs energy from the strike, the wrap acts as a bag to contain the shattered ceramic and keep it in front of the projectile, rather than allowing it to be scattered radially from the path of the projectile. This is an important aspect of the progressive failure mode of the panel.

In this embodiment, the wrapping layers for the SE 22's are aramid or PBO fibers in an epoxy matrix. Each SE core 23 is fully "bagged" or fully contained or encapsulated in its wrapping 24. The metallic components, the EB 28 and CB 34, are high strength steel with high hardness and low elongation. The EB may be similarly wrapped or bagged as the SE. In other embodiments, as in a prefabrication step, continuous lengths of EB material may be wrapped or sleeved in the same or similar aramid or PBO fibrous material, and then component pieces cut from the sleeved EB stock such that the ends of the individual EB components are exposed for mating with intersecting EB's and CB's. The CBs are not wrapped in this embodiment, however they may be partially or totally enclosed or encased in a wrap, similar to the other SE layer 20 components.

Figure 7A:
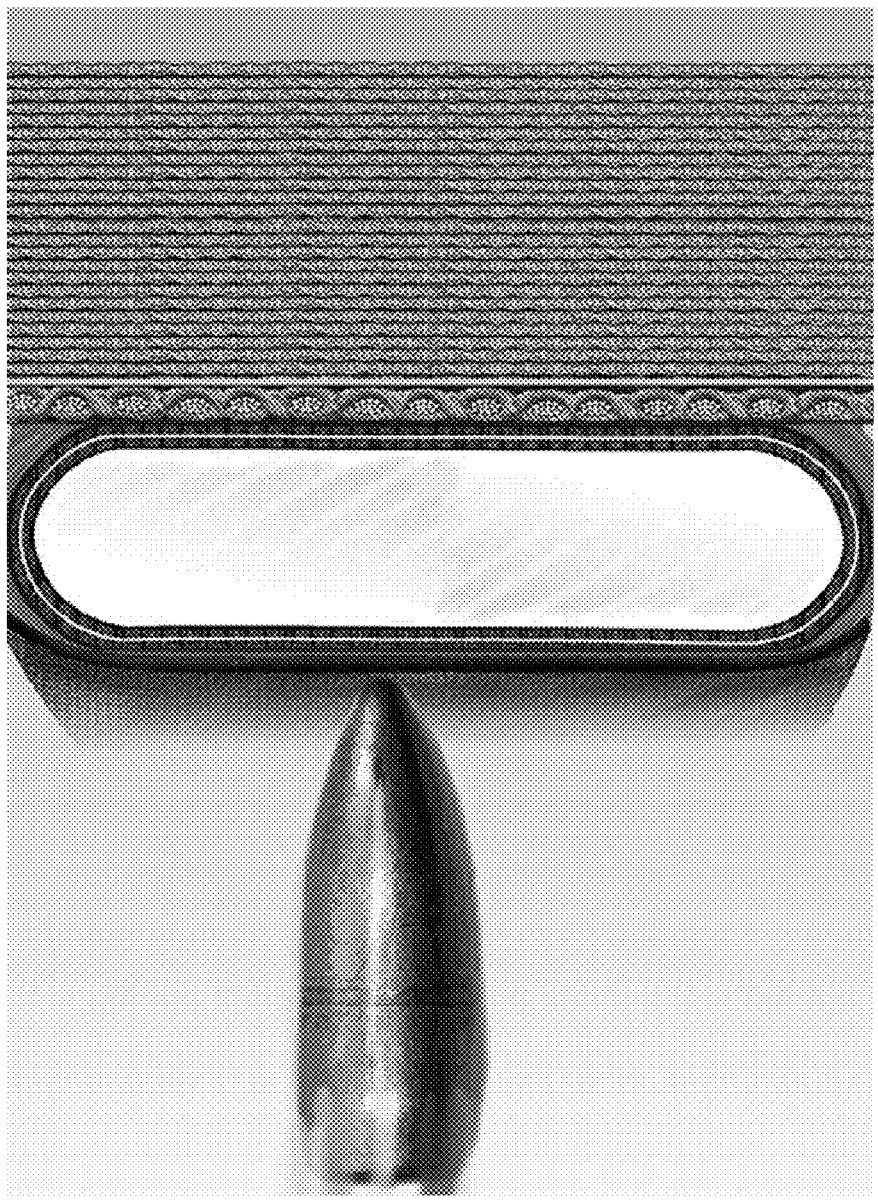
FIG. 7A-7E is a timeline sequence of cross section illustrations of a ballistic strike on the FIG. 1 embodiment of the invention, showing the initial impact, fracturing of the wrapped SE, transporting of the fractured, wrapped SE and projectile through the backer and into the fiber pack.
Figure 7B:
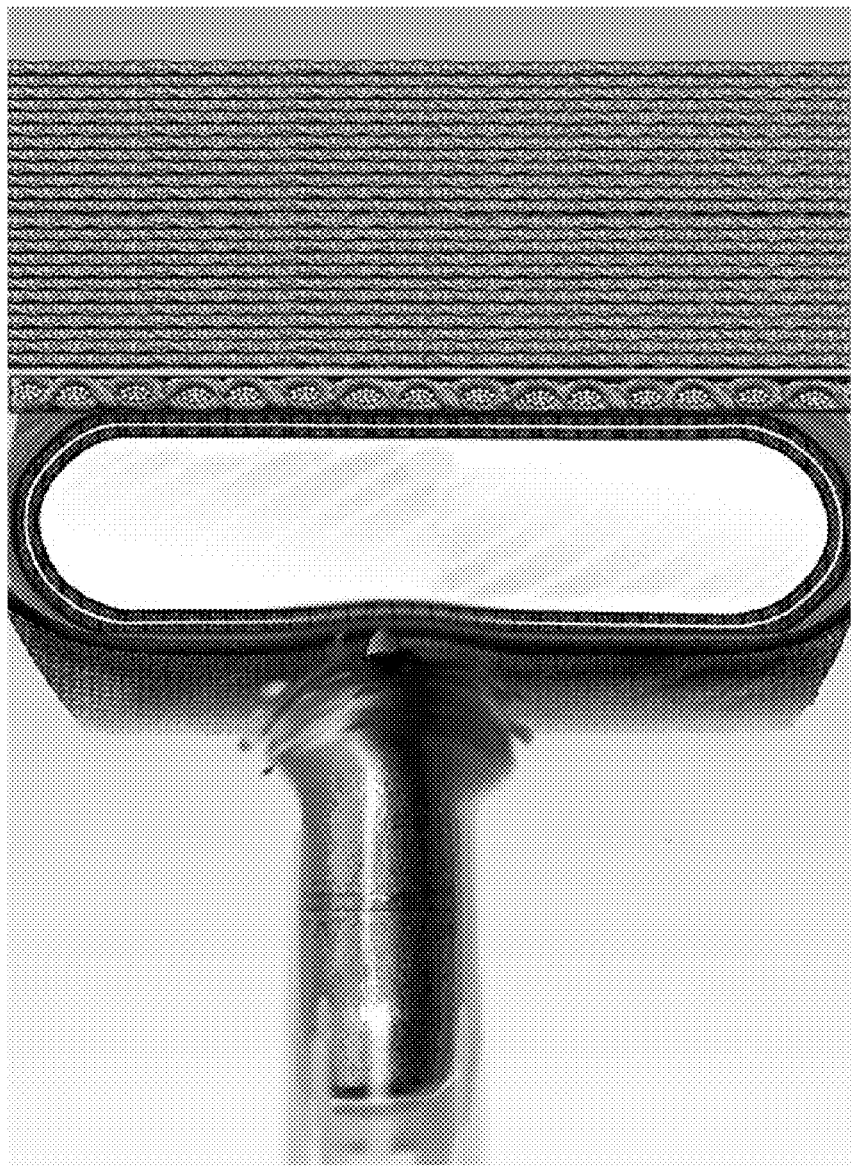

Referring here to the sequence of FIGS. 7A-7E, the progressive failure mode of the invention in response to a ballistic strike within its design limits is best explained by reference to these illustrations. This series of cross section illustrations depicts a timeline sequence of a ballistic strike on an SE in a panel of the invention. Referring to FIGS. 7A to 7B, the bullet strikes the spall cover 10 and the ceramic layer SE 20 where the lead-copper jacket is deformed and the hard core of the bullet begins to load up the on the wrapped ceramic SE 22. This is the Dwell phase as described by C. E. Anderson and J. D. Walker; ref "On the Hydrodynamic Approximation for Long-Rod Penetration," C. E. Anderson Jr., D. L. Orphal, R. R. Franzen, J. D. Walker, *International Journal of Impact Engineering*, Vol. 22, No. 1, 23-42, 1999.

Figure 7C:
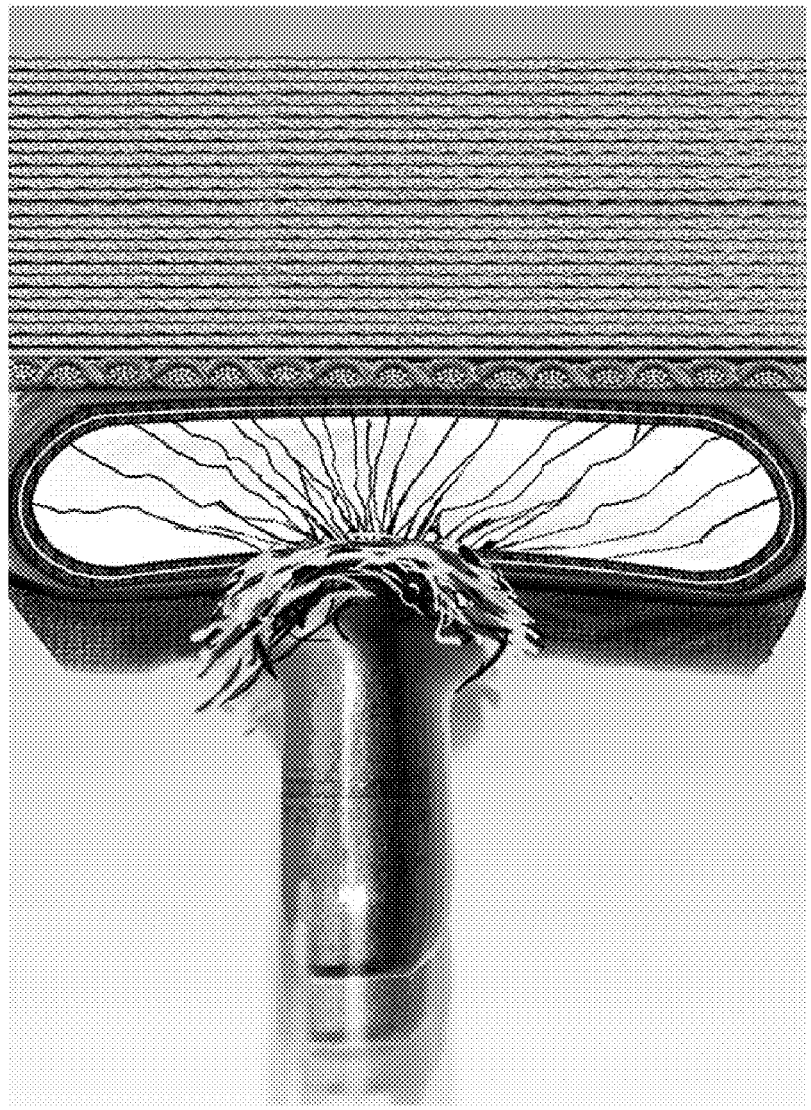
Figure 7D:
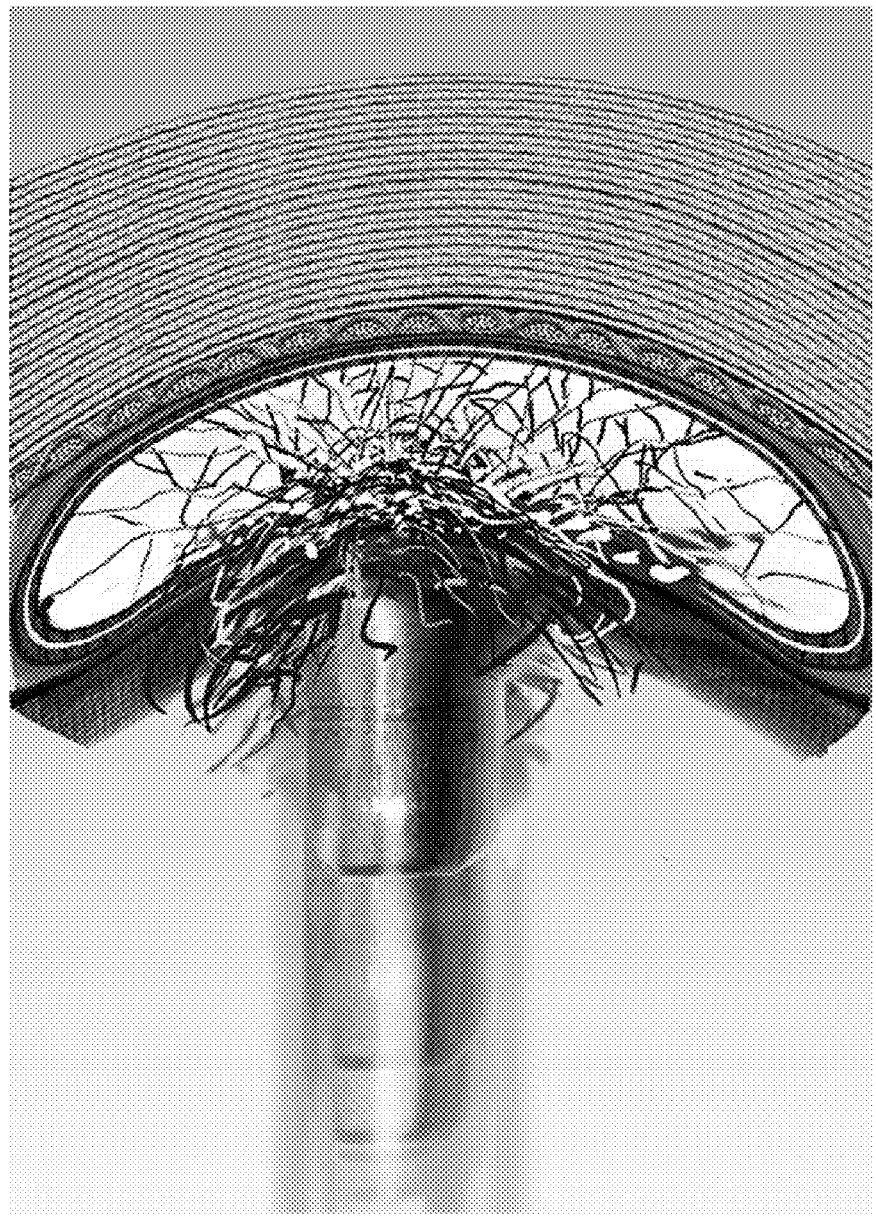
Figure 7E:
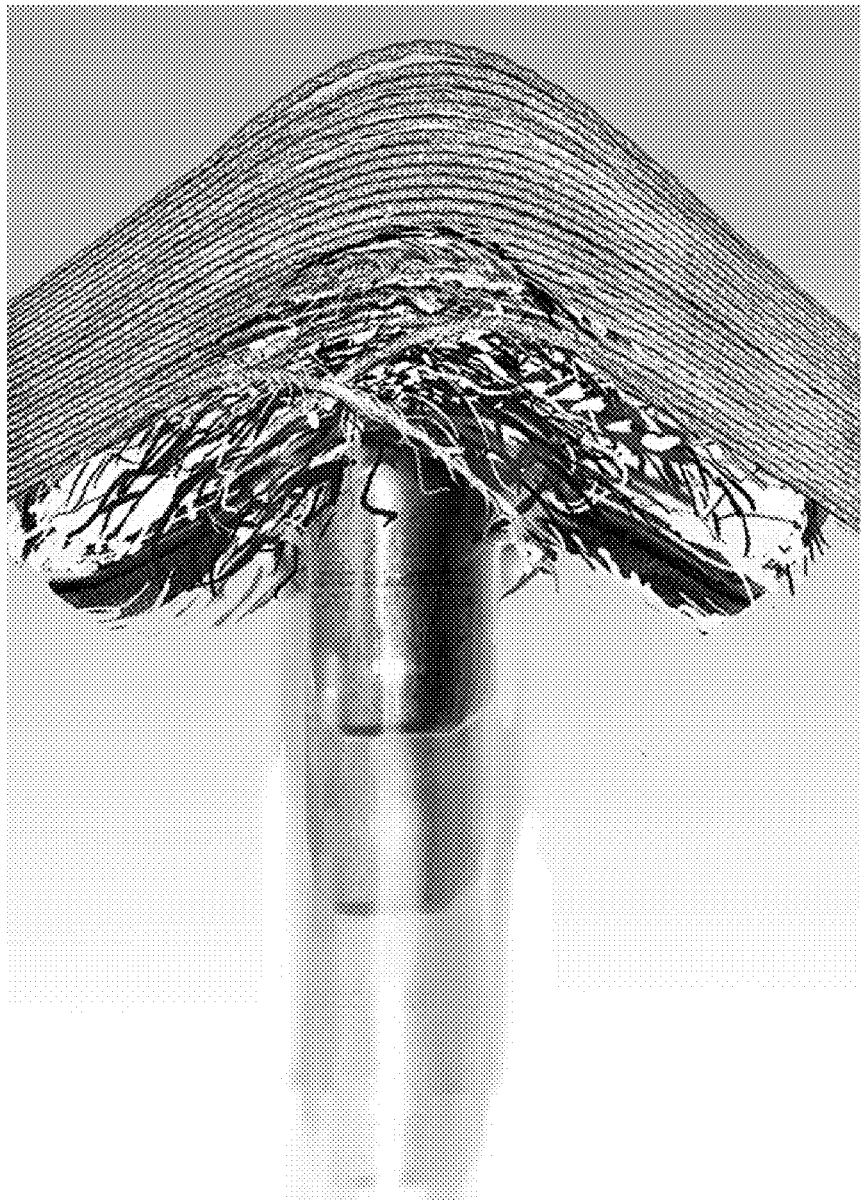

Referring to FIGS. 7C to 7D, at this point the momentum match begins to play an important roll in energy transfer. The flex backer 40 is now subjected to high forces around the perimeter of the SE and the fiber is starting to fail as the ceramic in the SE is also showing significant levels of fracture. Referring to FIGS. 7D to 7E, flex backer 40 must not fail prematurely but it must fail at the point shown in the sequence. The ceramic core of wrapped SE 22 is in fracture but has not localized and has not permitted the bullet an opening. At this point backer 40 must yield and permit the wrapped SE to accelerate into the fiber pack 50. This order of failure continues to permit momentum transfer and also maximizes the F×D equation or progressive work done to maximize the energy removed from the bullet.

This step defines the balance between the failure of the SE wrap to maintain the integrity of its mass and volume during core fracture and the failure of the flex backer, which permits or facilitates the transport of the integrated mass of the bullet and fractured SE into the fiber pack before the bullet has passed through the wrapped SE. If the backer 40 failure is not sequenced correctly the bullet does not propel the wrapped SE into the fiber pack. If the wrapped SE ceramic is not in front of the bullet, the fiber pack does not engage effectively. Because the bullet has a small frontal area it does not engage the fiber in the fiber pack well.

Engagement of the fiber pack is analogous to a ball being caught in a catcher's mitt. Good engagement of the fiber pack is based on large number of fibers bearing on the projectile frontal area and large deformations of the fiber layup well back from the strike zone. Good fiber engagement and be seen in fiber slippage translating 4-8" radially away from the strike zone into the fiber pack.

The integrated mass of bullet fractured ceramic and wrapper fiber is ideal as a projectile from the standpoint of fiber engagement. This integrated mass has a frontal area that is much larger than the bullet behind it. This area increase is a factor of approximately four to ten times that of the bullet. The increase in fiber engagement goes up with the square of the projectile diameter. A second major advantage of the integrated mass is the nature of its surface. Without damage or deformation a bullet is smooth and does not engage fiber in a frictional pair to any great degree. In contrast, the surface of the warping fiber and the ceramic fragments all provide high coefficient of friction and improve the engagement with the fiber pack. Final FIG. 7E illustrates this integrated mass-fiber pack engagement.

Actual live testing confirms the energy absorbing mechanisms enabled by the novel structure described herein, whereby a ballistic performance design limit can be achieved with a lighter, more flexible structure than heretofore possible.

Example 1

B4C ceramic of at least 99.5% density is wrapped with six plies of four-layer Dyneema UDPE tape. The ceramic is 5 mm thick with a 50 mm square format. The edge bars have a full radius undercut to their T profile matching the wrapped thickness and edge profile of the SE. The EB is 8 mm high and has the same wrap as the SE component. The spall cover is two layers of 6 oz/yd$^2$ knit lycra-nylon material bonded to the face of the SE wrap with Loctite 3030 PE grade low temperature adhesive. The flex backer is four plies of 3 oz/yd$^2$ 840 Denier/70/2 staple composite fabric bonded with a cement coating of AC grade Neoprene. The underside SE wrap is bonded to the flex backer with the same Loctite adhesive. The fiber pack consists of up to 1.5 lb/ft$^2$ of Dyneema shield material in combination with the composite yarn Twarron woven in the ⅓-⅓-⅓ configuration with UDPE materials on the outer faces.

This and similar embodiments may have a construction sequence as follows. The solid element ceramics, which may be boron carbide (B$_4$C) or aluminum oxide (Al$_2$O$_3$) or other suitable materials, are wrapped with the predetermined number of turns or layers of aramid fiber fabric. This fabric is adhered to the ceramic face through the use of primers that enhance the bonding mechanism. The ceramic is first primed with a primer that adheres well to the ceramic, and then a second primer is applied that adheres well to the fiber fabric and resin. The resin is chosen to match the surface characteristics of the selected fiber fabric. Typical resin-to-fabric ratios are approximately 60% by weight.

The edge bars may be wrapped in the same manner as the solid elements. Due to the concave portions of their cross section profile, they are isostatically pressed; either in a pressure chamber or an autoclave, or in a liquid isostatic press. This applies a uniform pressure over the entire surface area, forcing the wrapping to "form fit", or conforming to the concave or undercut surfaces of the edge bar. An Edge bars may be wrapped in a bag-like manner. Alternatively a length of EB material may be sheathed and cut into individual EB lengths, wrapped over their length but having exposed ends that interface with intersecting EBs and CB shanks.

Center buttons in these embodiments are not wrapped, as they represent a very small percentage of the SE layer mass. They play an important role in protecting the SE corner intersections at the initial strike by distributing the strike force to the adjacent SE, but are less critical to the momentum transfer concept during the later phases of the event. In other embodiments the CB may be fully or partially wrapped, such as by covering the exposed dome or convex strike surface. This variation allows presentation of a uniform material surface to the spall cover layer for continuity of the bonding process and integrity of the bonding sublayer.

The SE, EB and CB array is carefully assembled within a grid, framework or mold that defines the overall shape, size, and topographical profile of the intended area of coverage. The mold may be a simple, square, flat mold from which a flat, square panel would issue, or it may be of irregular shape and have a pre-determined simple or compound curvature that will more readily fit the size and shape of the intended area of coverage.

The wrapped SE tiles are then bonded on the exposed strike face side to a spall cover consisting in this case of two layers of lycra fabric using a neoprene adhesive and neoprene cement with a cross linking additive. On the opposite face, the wrapped tiles are bonded to a backer consisting of three layers of a Twaron/Kevlar woven fabric again using a neoprene adhesive and neoprene cement with PAPI. The use of the urethane fiber and the neoprene adhesives allows this composite to remain flexible in two degrees of freedom.

Behind this composite, opposite the strike face, is placed the fiber pack. The fiber pack in this example consists of Twaron fabric, or other ultra high molecular weight polyethylene material. These materials provide a high strength to weight ratio and "catch" the combined mass of the deformed projectile and removed ceramic material much like the action of a soccer net catching a ball.

This ballistic unit is then inserted into a nylon carrier pack that is fitted to the area of the body intended for coverage. Extremity protection of this type can be pre-formed to fit almost any area of the body that cannot be protected by solid ceramic plates.

Example 2

Another example of the invention uses ceramic-fiber solid element SEs that are three sided, 50 mm on a side. The slightly crowned ceramic core has a 6 mm dome height and an actual thickness of 5 mm. The SE/EB joint has a gap/height ratio of less than 25%. The ceramic core is of B4C material, TCE pre-stressed. The edge bars EB have the three facet end cut or face of FIG. 3, a T cross section profile size of 9 mm high and 9 mm wide, and are made of B4C ceramic. The center buttons CB are 20 mm diameter, 11 mm high at the domed top, including a shank that is 10 mm long, and are made of B4C ceramic. The rigid fiber covering wrap on all components consists of PBO 500 denier woven 5-10 ply material and high modulus epoxy B stage materials. The wrap is 1.5 mm thick. The flex backer is of an aramid-elastomeric design using three to twelve layers of 840 d composite yarn fabric. The system mass at this point is about 5 lb/ft2. The fiber pack consists of wovens and/or unidirectional fiber layers, generating an additional mass of 1 lb/ft2, using 400 denier and 70 denier staple composite yarn fabric or a mix of UDPE and composite yarn.

Example 3

Another example of the invention uses square ceramic-fiber solid elements (SE), the outer layer or wrap of which is a fiber laminate. The SEs are 75 mm on a side, of 5 mm thickness, after a steel containment layer is brazed to the ceramic core. The SE core material is of B4C material with TCE compression. The SE/EB/SE interfaces have a contact interface or zero gap, at zero degrees of flexure. The edge bars have a slightly domed T cross section profile 8 mm wide×9 mm high and are made of B4C material. The center button is 20 mm diameter and 10 mm high with its domed top, and make of B4C material. The rigid fiber cover wrap is of PBO material, 500 denier woven, five to ten plies, and uses high modulus epoxy B stage materials. The flex backer is of an aramid-elastomer construction, using three to twelve layers of 840 maximum denier composite yarn fabric. The fiber pack is as described in the prior example.

Example 4

Yet another example of an MEP design uses ceramic-fiber solid elements (SE) outer layer, using square SE's 50 mm on a side, with a 6 mm domed effective thickness or convex shaped strike surface, based on an actual 5 mm thickness ceramic core. The SE/EB/SE gap/height ratio is 25% or less at zero flexure and the overlap ratio (overlap in the plane) is 25%. The ceramic is B4C material, TCE pre-stressed. The edge bars EB are 9 mm×9 mm in cross section size and of B4C ceramic. The center button CB is 20 mm diameter, 11 mm thickness or tall including its domed top, the shank is 10 mm long, and the material is likewise B4C ceramic. The SE components use a rigid fiber cover wrap of 1.5 mm thickness, made from aramid 400 denier woven 5-10 ply and high modulus epoxy B stage materials. The flex backer in this example is an aramid-elastomer of three to twelve layers of 840 maximum denier composite yarn fabric. The laminate portion of the system has a mass 5 lb/ft2. The fiber pack consists of woven fabrics and/or unidirectional fiber layers of 400 denier and 70 denier staple composite yarn fabric or mix of UDPE and composite yarn, and has a mass of 1 lb/ft2.

The invention as claimed is susceptible of many variations. For example, there is an armor system for protection from a ballistic strike consisting of projectile of mass $M_1$, and velocity $V_1$, consisting of a flexible planar array of solid elements, where the planar array has a strike side and a back side, each solid element has a mass $M_2$ not greater than twice $M_1$. The individual solid elements are separable from the planar array on the occurrence of a ballistic strike such that the projectile and the separated solid element have a combined mass of $M_1+M_2$ and a common residual velocity $V_R$.

The system may have a flexible backer fabric layer bonded by an adhesive matrix to the back side of the planar array. The flexible backer fabric layer may be configured to fail in tensile upon the occurrence of a ballistic strike such that $V_R$ is equal or greater than $½(M_1V_1)/(M_{1+}M_2)$. There may be a flexible, elastic cover layer bonded to the flexible planar array.

The system may be configured as a garment for a wearer, and may have a multi-layered fiber pack of high tensile fibers configured within the garment between the flexible backer fabric layer and the wearer. The fiber pack may be configured to permit up to 44 mm of deflection response to a combined mass of SE and projectile penetrating the flexible backer fabric layer.

The solid elements may have a core element of ceramic material in the shape of a planar polygon. The core element may be encapsulated in a wrap of non-ceramic material. The core element may be wrapped with a solid element wrapping fabric of which the combined denier per unit width of the solid element wrapping fabric is equal to or greater than the combined denier per unit width of the flex backer fabric layer. The system may be configured such that the fracture load of a solid element is lower than the force required to free it from the planar array.

The planar array may have edge bars arranged in at least two sets of intersecting parallel lines extending between all adjacent solid elements, where each edge bar is no longer than an edge of an adjacent solid element. The edge bars may be configured with an undercut on each side to receive the edges of the adjacent solid elements in closely conforming relationships wherein the top of the edge bar extends at least partially over the abutting edge of the solid elements when the flexible planar array is at a state of zero flexure. The solid elements may be configured with rounded edges of uniform radius, and the undercuts of the edge bars configured with the same or a slightly larger uniform radius groove, whereby flexing of the planar array includes rotation of the edge bars on the rounded edges of the solid elements.

The edge bars may have ceramic edge bar cores sleeved or encapsulated with an edge bar wrapping fabric. The intersecting lines of edge bars may form intersections where a center button configured with a head and a shank may be placed with its shank extending into the intersection and its head extending over the area of the intersection on the strike side of said planar array.

The armor system may be configured such that under a ballistic strike, in-plane tensile stresses are generated in the flexible backer layer and compressive stresses are generated between the solid elements and edge bars. The solid element wrapping fabric and the edge bar wrapping fabric may consist of rigid fibrous wrap or cover having a tenacity of at least 23 gpd, an elongation to break of at most 3.5%, and a density of at least 30,000 denier per inch of solid element edge length.

The core element of a wrapped solid element may be made of boron carbide, and the wrap may be a fabric having a tensile strength per inch of solid element perimeter of at least 2000 lbs/inch. The boron carbide may be post-HIP boron carbide. The flexible, elastic spall cover may be a fibrous layer with an elongation of at least 50% at less than 100 lbf/inch. The design projectile for the armor system may have an effective frontal area of A, and the solid elements of the system may have an exposed strike side surface area greater than A. The fiber pack may be made of multiple fibrous layers of up to 1.5 lb/ft$^2$ total density, and the layers made of ultra high molecular weight polyethylene material. The flexible planar array at zero flexure may have a pre-configured curvature approximating the surface profile of an object of intended coverage.

Figure 10:
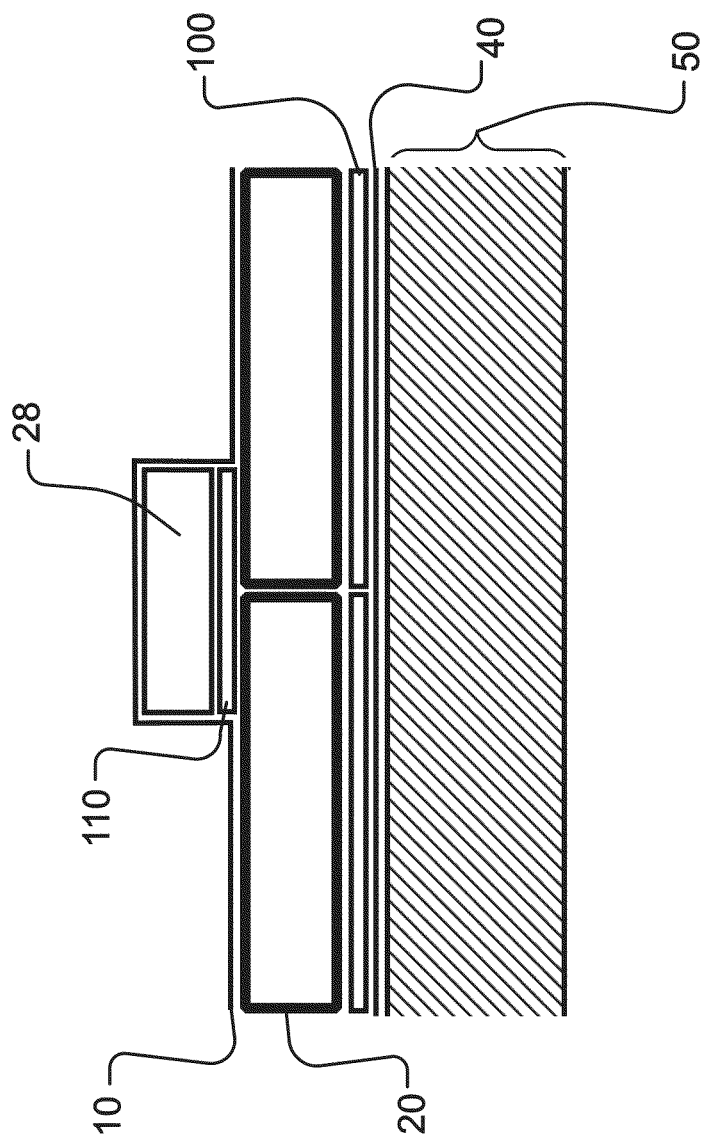
FIG. 10 is a cross-sectional illustration of an embodiment of the invention in which the solid elements are rectangular in cross section and include titanium backing layers, and the edge bars cover junctions between solid elements but do not extend between the solid elements, the edge bars being rectangular in cross section and including titanium backing layers.

FIG. 10 is a cross-sectional illustration of an embodiment in which the solid elements 20 are ceramic, and are substantially rectangular in cross section. In this embodiment, neither the solid elements 20 nor the edge bars 28 are wrapped. However, in the embodiment of FIG. 10 titanium backing layers 100, 110 are attached by an adhesive to one side of each of the solid elements 20 and edge bars 28. In similar embodiments, the titanium is omitted from the solid elements 20, from the edge bars 28, or from both.

The edge bars in this embodiment are rectangular in cross section, and do not penetrate between the solid elements, but instead are attached to the surface of the solid element layer 20 and are held in position over the junctures between the solid elements 20 by an elastomeric adhesive, and by the overlaying spall cover 10. In various embodiments, the ceramic is Aluminum Oxide ($Al_2O_3$), Silicon Carbide (SiC), or Boron Carbide ($B_4C$). In certain embodiments, the flexible backing material 40 is para-aramid, and in some embodiments the backing material 50 is soft-pressed UHMWPE (ultra-high molecular weight poly-ethylene). In embodiments, the stretch cover layer 10 is a Nylon/Urethane knit.

In various embodiments, a 5:2 thickness ratio of ceramic to Ti is used. Some embodiments intended for protection against small arms rounds provide 2 mm of Type 5 titanium 100 behind 5 mm of alumina 20, resulting in full edge-to-edge performance. For some applications, testing has shown that the ceramic solid element 20 needs to have a thickness that is greater than the hard core of the bullet. As a result, in these embodiments 5 mm of ceramic is the minimum required for the most common 7.62 mm caliber bullets, which have approximately 5 mm steel core elements.

The solid elements are constructed so as to remain mainly intact upon impact by a projectile, although the ceramic may be commutated by the impact. Upon impact by a projectile, the solid elements 20 are configured so as to combine substantially all of their mass with the mass of the projectile, and to travel with the projectile as the flexible backing material 40 is stretched and possible broken through and the combined projectile and solid element impacts the fiber pack 50. By combining the mass of the solid element with the mass of the projectile, the velocity of the combined projectile and solid element is significantly less and the impact area is significantly greater than what would result if the projectile alone were to break through the solid element 20 and continue on its own.

Figure 11A:
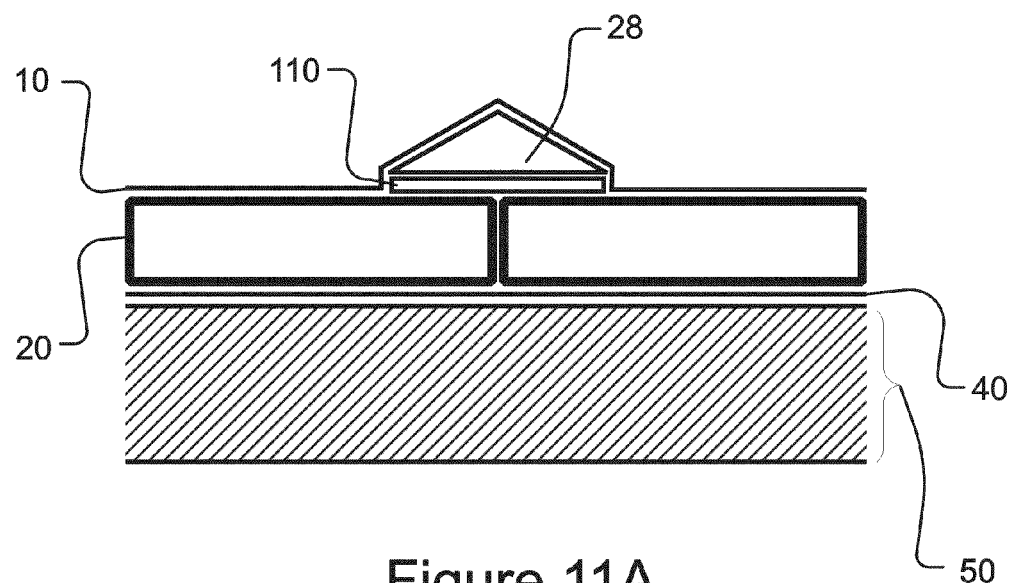
FIG. 11A is a cross sectional illustration of an embodiment similar to FIG. 10, but having edge bars with triangular cross sections and solid elements which do not include titanium backing layers, the embodiment being shown without flexure.
Figure 11B:
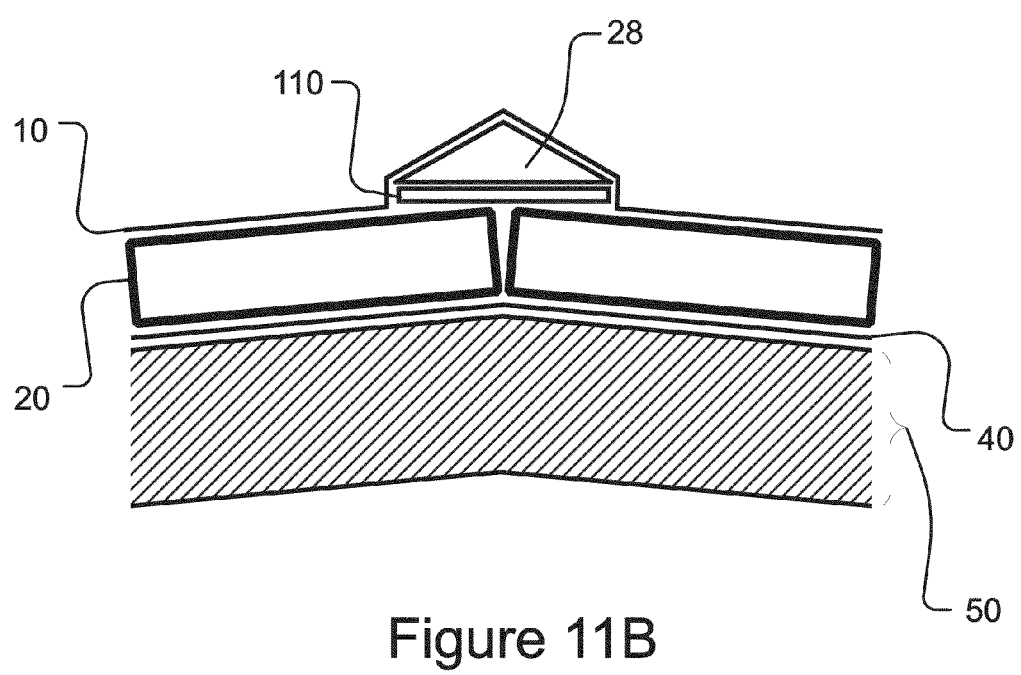
FIG. 11B is a cross sectional illustration of the embodiment of FIG. 11A shown flexed about the juncture of two solid elements.

Embodiments of the present invention must balance performance, weight, and cost issues. The solid elements 20 and edge bars 28 of the embodiment of FIG. 10 are less expensive to manufacture than the more complex shapes used in the embodiments of FIGS. 1-6. In the embodiment of FIG. 11A, the weight of the edge bars 28 is reduced compared to FIG. 10 by using triangular cross bars 28 rather than rectangular cross bars 28. In the embodiment of FIG. 11A, a layer of titanium 110 is included beneath each cross bar 28, but not beneath the solid elements 20. FIG. 11B illustrates flexing of the MEP system of FIG. 11A about a juncture between two solid elements 20. Note that an elastomeric adhesive is used to attach the titanium layers 110 to the solid elements.

In various embodiments, the solid elements are rectangular in shape, having width and height dimensions of substantially 1 inch×1 inch or 1 inch×2 inches. As mentioned above, in some of these embodiments the thickness of the solid elements is between 5 mm and 7.5 mm. These dimensions are suitable in various embodiments for allowing strips or panels of the MEP to conform to the shapes and movements of the body of a wearer.

Figure 12A:
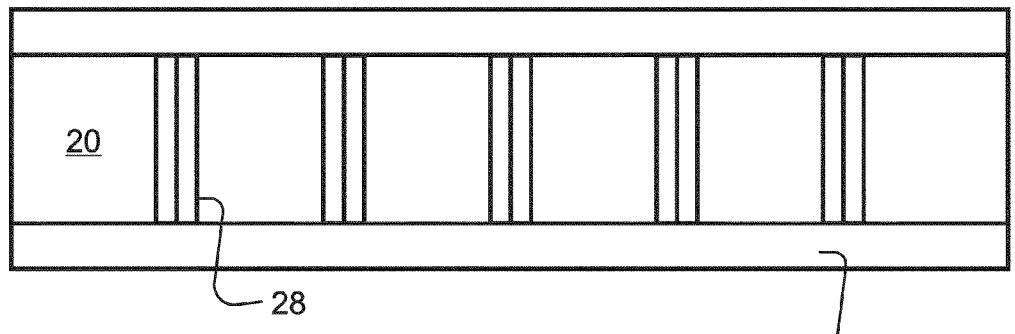
FIG. 12A is a top view of an embodiment of the invention which includes a single row of adjoining rectangular solid elements and a plurality of parallel edge bars covering the junctures between the solid elements.

With reference to FIG. 12A, in some embodiments the solid elements 20 are assembled into single rows or strips of solid elements which flex in only one direction. These embodiments include parallel edge bars 28 in only one direction, and do not require center "buttons" 34, further reducing the mass of the system. In the embodiment of FIG. 12A, the flexible backing 40 is one inch wider than the solid elements 20, thereby providing an easy means for attachment of the MEP strip to a carrier garment.

Figure 12B:
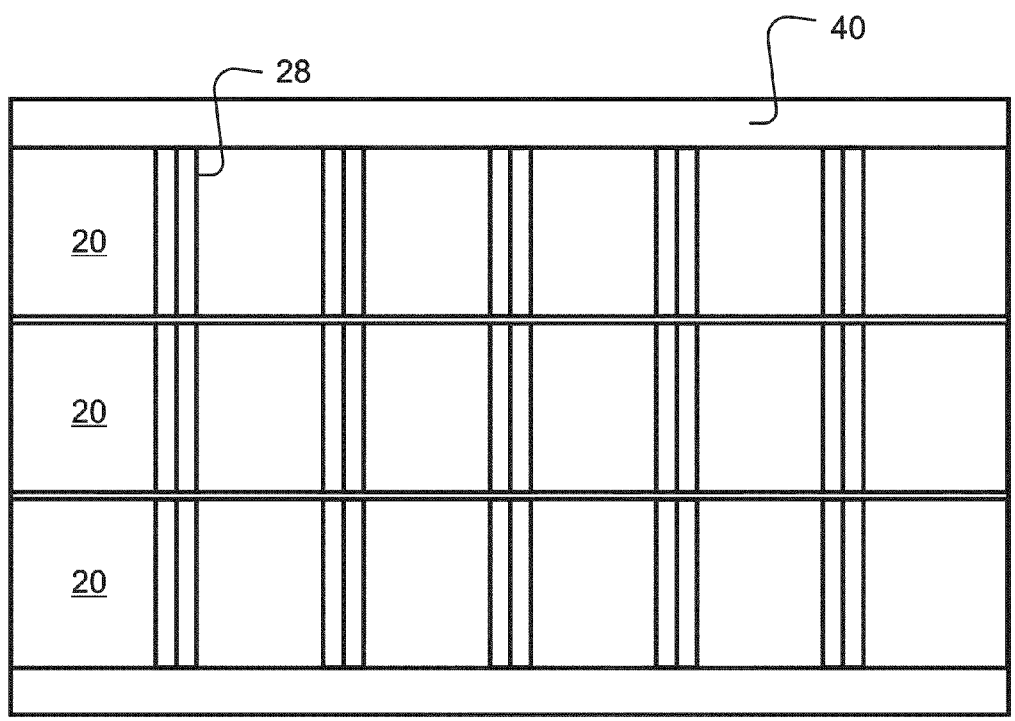
FIG. 12B is a top view of an embodiment of the invention which includes a plurality of the single rows of FIG. 12A aligned and joined in adjacent rows.

As illustrated in FIG. 12B, a plurality of the strips of FIG. 12A can be aligned and attached to each other (or to a carrier garment) in adjacent rows by attaching the flexible backings 40 of adjacent strips to each other, using sewing, adhesives, or other means of attachment known in the art. This arrangement of parallel strips provides flexibility in two dimensions, since each of the strips is flexible in one dimension, and flexing is also possible about the junctures between adjacent strips.

Figure 13A:
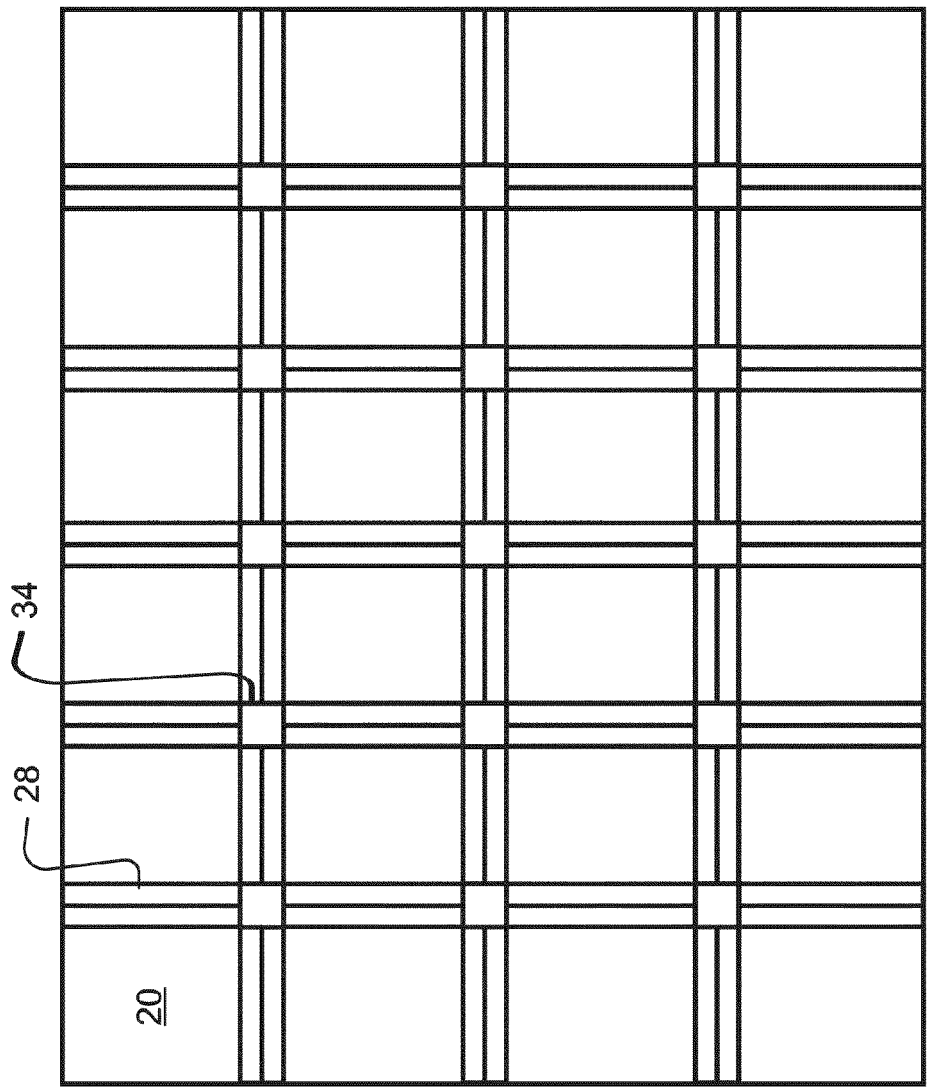
FIG. 13A is a top view of a planar array of solid elements which includes a plurality of rows of rectangular solid elements, junctures between adjacent solid elements being covered by edge bars and intersections of junctures being covered by center buttons.

FIG. 13A illustrates an embodiment of the present invention which can flex in two dimensions. The solid elements have substantially rectangular shapes, and are arranged adjacent to each other in a matrix pattern. Edge bars 28 having lengths equal to the side dimensions of the solid elements 20 are placed on top of the junctures between the solid elements 20, and center buttons 34 are located over the corners where the junctures intersect. Neither the edge bares 28 nor the center buttons 34 penetrate between the solid elements 20. In various embodiments, the edge bars 28 and center buttons 34 are simple, flat rectangles. In other embodiments, the edge bars 28 are triangular in shape, as shown in FIGS. 11A and 11B, and/or the center buttons 34 include top portions shaped as pyramids.

Figure 13B:
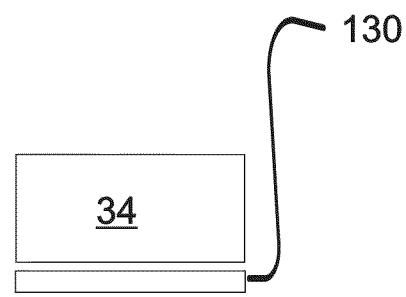
FIG. 13B is a cross-sectional view of one of the center buttons of FIG. 13A, the center button including a titanium backing.

FIG. 13B is a cross-sectional illustration of a center button 34 having a rectangular cross-sectional shape. In the embodiment of FIG. 13B, the center button 34 includes a titanium backing layer 130.

In various embodiments, to manufacture the MEP panels of the present invention, the ceramic solid elements 20, edge bars 28 (and in certain embodiments also the center buttons 34) are formed and then bonded to titanium backings 100, 110, 130. In other embodiments, titanium backings are only adhered to the edge bars 28 (and to the center buttons 34, if they are included). Then the solid elements 20 and their titanium backings 100 (if included) are bonded to elastomeric and high modulus fiber textiles interfaces 40 which allow flexing while maintaining the integrity of the positional relationship of neighboring solid elements 20. In some embodiments where the ceramic is $Al_2O_3$, the alumina powder is mixed with water and a dispersant, and then poured into a slip cast mold. After thorough drying, the molded $Al_2O_3$ parts are then exposed to a simple sintering method. Once removed from the sintering step, the $Al_2O_3$ parts 20, 28, 34, are then primed to prepare for adhesion to the titanium 100, 110, 130 (depending on the embodiment).

Once the $Al_2O_3$ parts 20, 28, 34 are completed, depending on the embodiment, the solid elements 20, edge bars 28, and/or center buttons 34 are adhered to the titanium backings 100, 110, 130. In some embodiments, the thicknesses of the ceramic and titanium layers are in a ratio of 5:2. In other embodiments, 1 mm layers of titanium 110, 130 are adhered only to the edge bars 28 and center buttons 34. The titanium 100, 110, 130 is first prepared by cleaning its surface so that it is free of contaminants, and then a primer is applied. A bonding adhesive is applied to both the $Al_2O_3$ 20, 28, 34 and the Ti 100, 110, 130 parts, and then they are mated together under controlled heat and pressure.

Once the hard ceramic and titanium components have been combined, they need to be attached and sandwiched between the elastomeric cover high stretch textile 10 and the high-modulus backing textile 40. The hard components 20/100, 28/110, 34/130 are primed again to promote adhesion, and both the textile 10, 40 and the hard components 20/100, 28/110, 34/130 are coated with curable elastomer. The parts are now ready to be assembled and cured.

The high-modulus backing textiles 40 are placed in a layup frame, upon which the solid elements 20/100 are precisely positioned adjacent to each other. An edge bar 28/110 is then place over each of the junctures between adjacent solid elements 20. In some embodiments, center buttons 34 are placed over the intersections of the junctures. An elastomeric stretch cover layer 10 is then positioned over the entire assembly, and the assembly is autoclaved for curing.

Slip casting and simple sintering of alumina is a fully scalable low cost production process. However it is not consistent with $B_4C$ materials. In some embodiments which use $B_4C$ as the ceramic, the solid elements 20, edge bars 28, and center buttons 34 are injection molded and reaction bonded.

Figure 14:
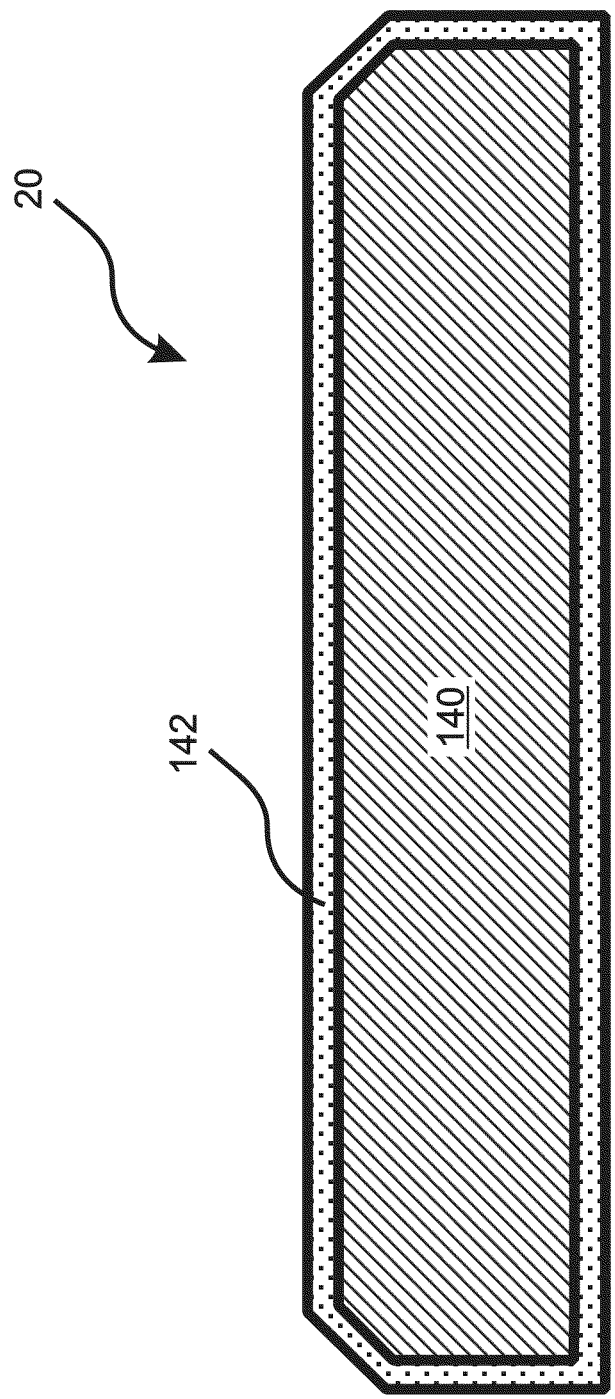
FIG. 14 is a cross-sectional view of a solid element in an embodiment of the invention, the solid element including an inner ceramic core surrounded by an outer ceramic layer, the outer ceramic layer having a higher coefficient of thermal expansion than the inner ceramic core.

With reference to FIG. 14, some embodiments of the present invention incorporate solid elements 20, edge bars 28 and/or center buttons 34 which include a ceramic core and an outer ceramic layer, the outer ceramic layer having a higher coefficient of thermal expansion than the ceramic core. FIG. 14 is a cross-sectional illustration of a solid element 20 having such a ceramic core 140 and outer ceramic layer 142. In some of these embodiments, the outer ceramic layer 142 is applied as a glaze, while in other of these embodiments the outer ceramic layer is formed by doping the outer surface of the ceramic solid element 20 so as to cause matrix substitution in the ceramic crystal structure near the surface of the ceramic. In these embodiments, the outer layer is applied and/or formed before and/or while the ceramic is at an elevated temperature, so that significant compressive pre-stress is applied to the ceramic core 140 as the surrounding outer ceramic layer 142 cools and contracts. Because this pre-stress is in compression, the brittle solid element core 140 must be taken through neutral pressure and into tension by a projectile before it can fracture.

These and other various examples, embodiments and variations within the scope of the claims and equivalents thereof, will be readily apparent and well understood from what has been disclosed herein to those skilled in the art.

I claim:

1. An armor system for protection from a ballistic strike by a projectile, the armor system comprising:
a plurality of rigid, unfenestrated solid elements maintained by a supporting structure in a flexible planar array, the planer array having a strike side and a back side, the supporting structure including a flexible backer fabric layer bonded by an adhesive matrix to the back side of said planar array, the flexible backer fabric layer being configured to fail in tensile before the projectile has fully penetrated the solid element;
each of the solid elements being separable from the planar array upon impact on the solid element by the projectile and consequent tensile failure of the supporting structure; and
upon impact by the projectile, separating of the solid element from the planar array, and tensile failure of the supporting structure, each of the solid elements having material properties causing it to remain substantially intact and to combine substantially all of its mass with the mass of the projectile, so that the projectile and the solid element penetrate the failed supporting structure as a combined unit having a reduced velocity and an enlarged impact area of the combined mass of the solid element and projectile, as compared to an impact velocity and impact area of the projectile alone.

2. The armor system of claim 1, wherein the supporting structure includes a flexible, elastic cover layer bonded to the flexible planar array on the strike side of the flexible planar array.

3. The armor system of claim 2, wherein the flexible, elastic cover includes a fibrous layer with an elongation of at least 50% at less than 100 lbf/inch.

4. The armor system of claim 1, further comprising a multi-layered fiber pack of high tensile fibers configured so as to be impacted by the combined solid element and projectile after separation of the combined solid element and projectile from the supporting structure.

5. The armor system of claim 4, wherein the fiber pack includes multiple fibrous layers of up to 1.5 $lb/ft^2$ total density, the layers including ultra high molecular weight polyethylene material.

6. The armor system of claim 1, wherein at least one of the solid elements includes at least a core element of ceramic material.

7. The armor system of claim 6, wherein the fracture load of the ceramic core element of the solid element is lower than the force required to separate the solid element from the planar array.

8. The armor system of claim 6, wherein the force required to separate the solid element from the planar array is sufficient to commutate the ceramic core element of the solid element.

9. The armor system of claim 6, wherein the core element of ceramic material of the solid element includes boron carbide.

10. The armor system of claim 9, wherein the core element includes boron carbide having a relative density of substantially 100%.

11. The armor system of claim 6, wherein the core element of ceramic material of the solid element is surrounded by an outer layer of ceramic material, the outer layer of ceramic material having a coefficient of thermal expansion which is greater than the coefficient of thermal expansion of the core element of ceramic material of the solid element, the outer layer of ceramic material and the core element of ceramic material of the solid element being cooled from an elevated temperature so as to cause the outer layer of ceramic material to apply a compressive force to the core element of ceramic material of the solid element.

12. The armor system of claim 11, wherein the outer layer of ceramic material is applied as a glaze to the core element of ceramic material of the solid element.

13. The armor system of claim 11, wherein the outer layer of ceramic material is formed by doping an outer portion of the core element of ceramic material, so as to cause matrix substitution in the crystal structure of the outer portion.

14. The armor system of claim 6, wherein each of the solid elements includes a layer of titanium attached to a back side of the solid element.

15. The armor system of claim 1, wherein each of the solid elements is shaped substantially as a rectangle having a width of substantially 1 inch and a length of between 1 inch and 2 inches.

16. The armor system of claim 1, wherein each of the solid elements has a thickness of between 5 mm and 7.5 mm.

17. The armor system of claim 1, wherein the planar array includes a single row of aligned, adjacent solid elements.

18. The armor system of claim 1, wherein the planar array includes a plurality of rows of aligned, adjacent solid elements.

19. The armor system of claim 1, wherein each of the solid elements is shaped substantially as a planar polygon, the planar polygons being arranged in the planar array with aligned, adjacent edges.

20. The armor system of claim 19, further comprising edge bars attached by an elastomeric adhesive to the strike side of the planar array, the edge bars being positioned so as to overlap junctures between the aligned, adjacent edges of the solid elements.

21. The armor system of claim 20, wherein at least one of the edge bars is rectangular in cross section.

22. The armor system of claim 20, wherein at least one of the edge bars has a cross sectional shape which is thickest in a region directly over the juncture between the solid elements and thinner in regions offset from the juncture.

23. The armor system of claim 20, wherein each of the edge bars has a length which is equal to the length of the juncture which it overlaps, so that the edge bar does not extend beyond the juncture which it overlaps.

24. The armor system of claim 20, wherein each of the edge bars includes at least a core element of ceramic material.

25. The armor system of claim 24, wherein each of the edge bars includes a layer of titanium interposed between the edge bar and the strike surface of the planar array of solid elements.

26. The armor system of claim 20, further comprising center buttons attached by an elastomeric adhesive to the strike side of the planar array, the center buttons being positioned so as to overlap intersections of the junctures between the aligned, adjacent edges of the solid elements.

27. The armor system of claim 26, wherein each of the center buttons includes at least a core element of ceramic material.

28. The armor system of claim 27, wherein each of said center buttons includes a layer of titanium interposed between the center button and the strike surface of the planar array of solid elements.

29. The armor system of claim 1, wherein the adhesive matrix bonding of the flexible backer fabric layer to the back side of the planar array has a shear bond strength of between 400 and 1000 psi.

30. An armor system comprising:
a plurality of rigid, unfenestrated solid elements maintained by a supporting structure in a flexible planar array, the planer array having a strike side and a back side, the supporting structure including a flexible backer fabric layer bonded by an adhesive matrix to the back side of said planar array,
upon impact by a projectile of 2 to 700 grains with an impact velocity ranging from about 300 to about 1500 meters/second, each of the solid elements having material properties causing it to separate as a whole from the planar array while remaining substantially intact and combining substantially all of its mass with the mass of the projectile,
the flexible backer fabric layer having material properties causing it to fail in tensile when impacted by the combined solid element and projectile, thereby allowing the projectile and solid element to penetrate completely through the supporting structure as a combined unit.

* * * * *